(12) United States Patent
Rewerts et al.

(10) Patent No.: US 11,851,156 B2
(45) Date of Patent: Dec. 26, 2023

(54) AIRCRAFT FUSELAGE CONFIGURATIONS FOR UPWARD DEFLECTION OF AFT FUSELAGE

(71) Applicant: ZSM HOLDINGS LLC, Dover, DE (US)

(72) Inventors: Scott David Rewerts, Summerfield, NC (US); Jason C. Bell, Frederick, CO (US); Mark Emil Lundstrom, Boulder, CO (US)

(73) Assignee: ZSM Holdings LLC, Dover, DE (US)

( * ) Notice: Subject to any disclaimer, the term of this patent is extended or adjusted under 35 U.S.C. 154(b) by 0 days.

(21) Appl. No.: 17/981,805

(22) Filed: Nov. 7, 2022

(65) Prior Publication Data

US 2023/0182885 A1 Jun. 15, 2023

Related U.S. Application Data

(63) Continuation of application No. 17/465,779, filed on Sep. 2, 2021, now Pat. No. 11,492,094, which is a
(Continued)

(51) Int. Cl.
*B64C 1/22* (2006.01)
*B64D 9/00* (2006.01)
(Continued)

(52) U.S. Cl.
CPC ............... *B64C 1/22* (2013.01); *B64C 1/20* (2013.01); *B64D 9/00* (2013.01); *B64C 1/00* (2013.01); *F03D 13/40* (2016.05)

(58) Field of Classification Search
CPC ........... B64C 1/22; B64C 1/20; B64C 1/1415; B64C 2001/0045; B64D 9/00; F03D 13/40
See application file for complete search history.

(56) References Cited

U.S. PATENT DOCUMENTS

| 2,134,260 A | 10/1938 | Nickerson |
| 2,383,935 A * | 9/1945 | Dean ...................... B64C 1/061 |
| | | 244/117 R |

(Continued)

OTHER PUBLICATIONS

International Search Report and Written Opinion for Application No. PCT/US20/49787, dated Nov. 30, 2020 (20 pages).
(Continued)

*Primary Examiner* — Benjamin P Lee
(74) *Attorney, Agent, or Firm* — Barnes & Thornburg LLP

(57) ABSTRACT

A fixed-wing cargo aircraft having a kinked fuselage is disclosed. The fuselage contains a continuous interior cargo bay, and includes a forward portion, an aft portion, and a kinked portion forming a junction in the fuselage between the forward and aft portions. The kinked portion contains a transition region of the cargo bay and defines a bend between a forward centerline and an aft centerline. The kinked portion is formed with a forward transverse frame section, a separate aft transverse frame section, and a plurality of longitudinal frame elements extending between the forward and aft frame sections, the forward frame being coupled to an aft end of the forward portion and the aft frame section being coupled to a forward end of the aft portion such that the aft frame section is angled with respect to the forward frame section about a lateral axis of the cargo aircraft.

20 Claims, 33 Drawing Sheets

Related U.S. Application Data continuation of application No. PCT/US2021/021792, filed on Mar. 10, 2021.

(51) Int. Cl.
  *B64C 1/20* (2006.01)
  *F03D 13/40* (2016.01)
  *B64C 1/00* (2006.01)

(56) References Cited

U.S. PATENT DOCUMENTS

| | | | | |
|---|---|---|---|---|
| 2,425,499 | A * | 8/1947 | Watter | B64C 3/00 244/118.3 |
| 2,425,972 | A * | 8/1947 | Watter | B64C 1/22 244/118.3 |
| 2,942,812 | A * | 6/1960 | Pauli | B64C 1/1415 296/61 |
| 2,998,948 | A | 9/1961 | Sisk | |
| 3,374,972 | A | 3/1968 | Webb, Sr. | |
| 3,419,232 | A * | 12/1968 | McStay | B64C 23/005 244/119 |
| 3,972,427 | A * | 8/1976 | Stanley | B60P 1/02 280/727 |
| 5,069,402 | A * | 12/1991 | Wortman | B64C 23/06 D12/335 |
| 8,121,786 | B2 | 2/2012 | Morbey et al. | |
| 8,708,282 | B2 * | 4/2014 | Helou, Jr. | B64C 39/02 244/119 |
| 2004/0200930 | A1 | 10/2004 | Bays-Muchmore et al. | |
| 2009/0173824 | A1 | 7/2009 | Perez-Sanchez | |
| 2010/0252682 | A1 | 10/2010 | Pahl | |
| 2015/0183519 | A1 * | 7/2015 | Llamas Sandin | B64C 1/1415 244/13 |
| 2016/0311512 | A1 * | 10/2016 | Sankrithi | B64C 1/061 |
| 2018/0273176 | A1 * | 9/2018 | Paunicka | B64D 5/00 |
| 2020/0207475 | A1 | 7/2020 | Dobberfuhl et al. | |
| 2021/0129972 | A1 * | 5/2021 | Sankrithi | B64D 9/00 |
| 2021/0371105 | A1 * | 12/2021 | Rewerts | G06Q 10/0832 |
| 2021/0380218 | A1 * | 12/2021 | Rewerts | B64D 9/00 |
| 2021/0380245 | A1 * | 12/2021 | Rewerts | B64F 1/32 |
| 2021/0380247 | A1 * | 12/2021 | Bell | B64C 1/06 |
| 2022/0024589 | A1 * | 1/2022 | Karni | B64C 39/00 |
| 2023/0046394 | A1 * | 2/2023 | Sampedro-Thompson | B64C 3/32 |

OTHER PUBLICATIONS

International Search Report and Written Opinion for Application No. PCT/US2021/021792, dated May 20, 2021 (12 pages).

No Author Listed, "747-400/-400ER Freighters" StartupBoeing. May 2010.

No Author Listed, Antonov Airlines Brochure. Jul. 2019. [online] retrieved from <URL: https://www.antonov-airlines.com/wp-content/uploads/2019/07 /Antonov-Airlines- brochure.pdf>.

No Author Listed. C-130J Super Hercules Brochure, Lockheed Martin.

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

\* cited by examiner

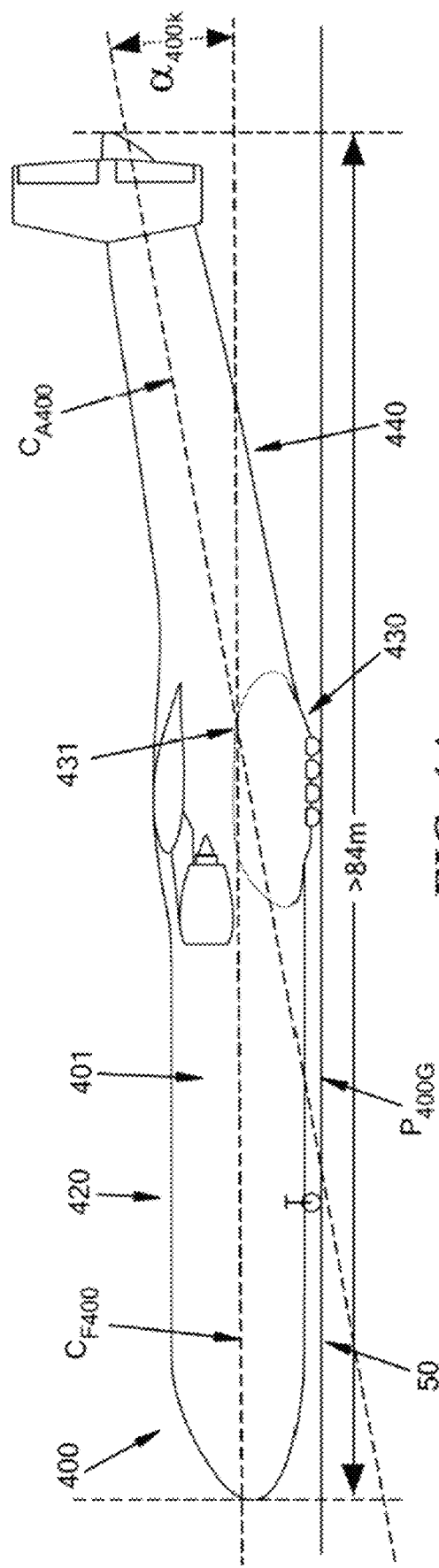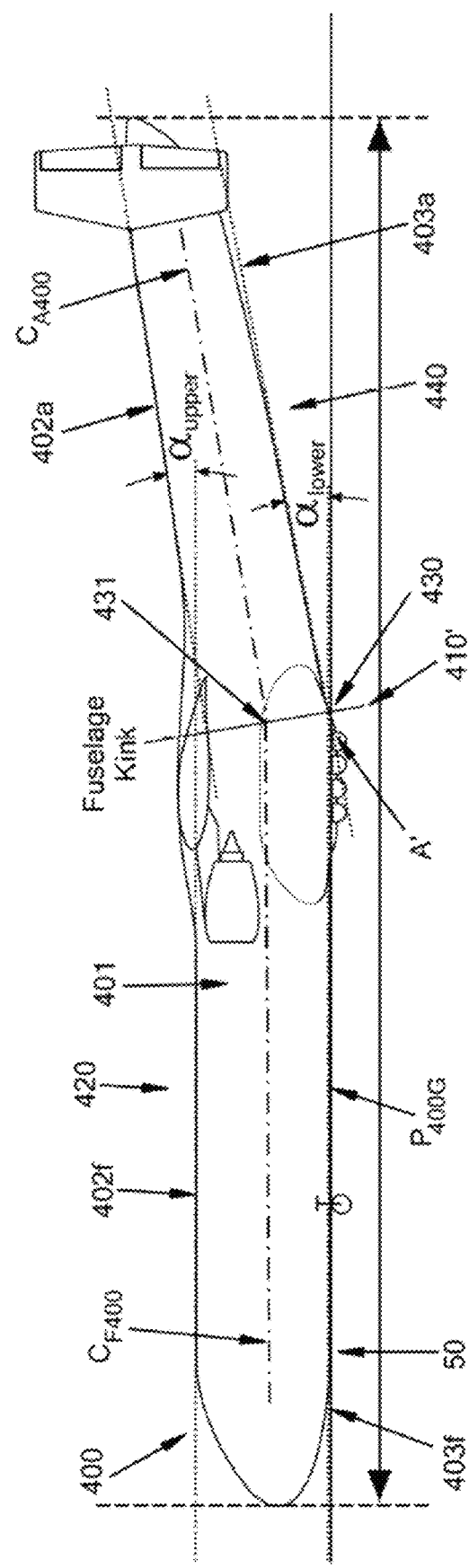

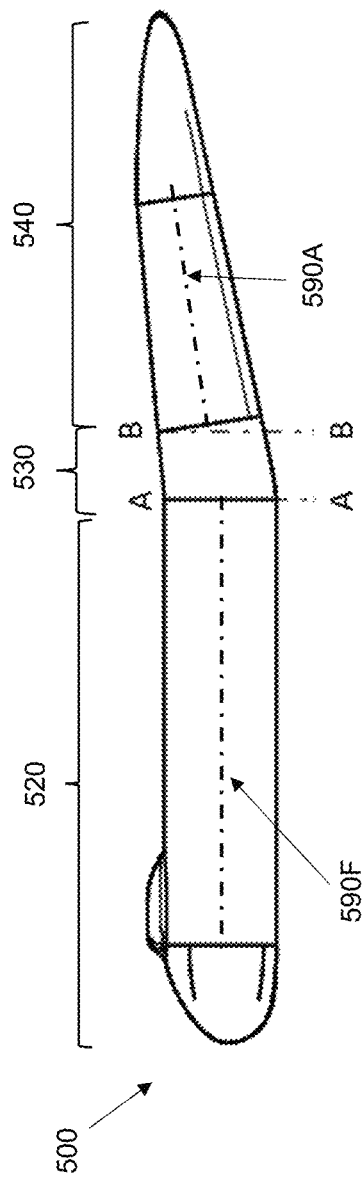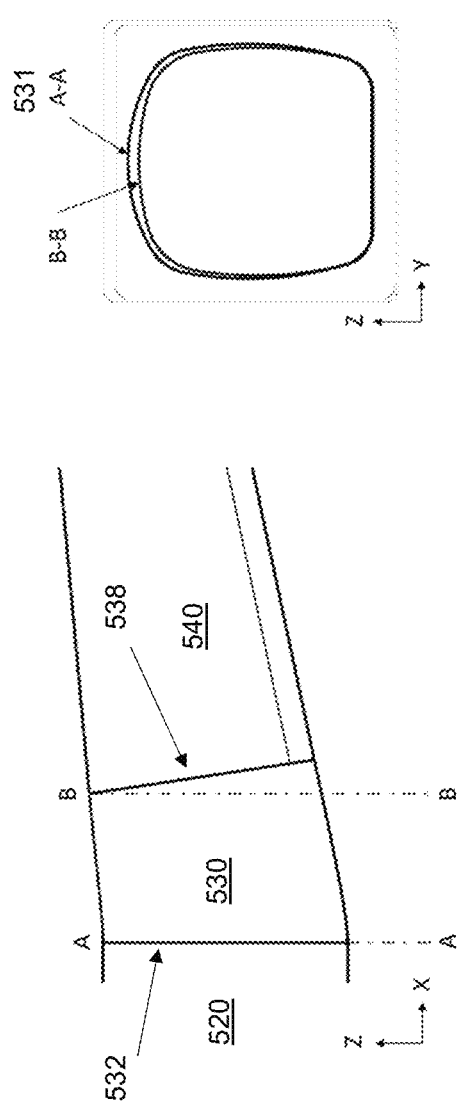
FIG. 10A
FIG. 10B
FIG. 10C

AIRCRAFT FUSELAGE CONFIGURATIONS FOR UPWARD DEFLECTION OF AFT FUSELAGE

CROSS-REFERENCE TO RELATED APPLICATIONS

The present application is a continuation of and claims priority to U.S. patent application Ser. No. 17/465,779, filed Sep. 2, 2021, which is a U.S. national stage filing from International Application No. PCT/US2021/021792, filed Mar. 10, 2021, the contents of each which is hereby incorporated by reference in its entirety.

FIELD

The present disclosure relates to fuselage designs for cargo aircraft, and more particularly to structural airframe designs that allow for continuous interior cargo bays of such fuselages to transport large, long cargo items while being able to have a steep pitch-up angle that allows for short takeoff and landing operations, while also avoiding tailstrike.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites in previously undeveloped locations become viable both onshore and offshore. These sites may also be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both roads and railways are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Existing cargo aircraft, including the largest aircraft ever to fly, are not able to transport extremely largo cargo, even if that cargo is, in all dimensions, smaller than the aircraft itself. This limitation is often the result of cargo aircraft, even those purpose built to be cargo aircraft, not fully utilizing their overall size as cargo bay volume. This constraint has many causes, one of which is related to the ability of the aircraft to takeoff and land without excessive runway length. Larger and heavier aircraft take more energy to accelerate during takeoff, as well are more energy to decelerate upon landing. Accordingly, traditional solutions involve increasing the lift provided by the aircraft's lifting surfaces to allow the aircraft to get off the ground at a slower speed and, conversely, to allow the aircraft to approach the runway at a slower speed (while still being able to abort and climb, if necessary).

One way that large cargo aircraft reduce their takeoff and landing speeds is by achieving a relatively large angle of attack during takeoff and landing, which is usually accomplished by allowing the aircraft to pitch-up while on or near the ground. Because this solution risks the aft fuselage or tail striking the ground if the plane over-rotates, fixed-wing aircraft have a unique requirement called a tail strike requirement. To takeoff, a fixed-wing aircraft generally accelerates from rest to a specific speed (called a rotation speed), then pitches (i.e., rotates about a lateral axis of the plane which passes through a landing gear rotation axis) in a nose-upwards/tail downwards direction to lift-off the runway. To land, fixed-wing aircraft generally decelerate to a much lower flight speed (to decrease the amount of landing runway distance necessary). During this deceleration, the aircraft must perform a pitch-up flare maneuver (which rotates the nose upwards and tail downwards) just above the ground to achieve minimum speed for landing. In both the takeoff rotation and landing flare cases, fixed-wing aircraft are at extreme orientations relative to the nearby ground, with the aircraft fuselage being oriented nose-upwards and tail-downwards. At these extreme orientations, the aircraft tail must not strike the ground below it. This is termed the tailstrike requirement and is illustrated in FIG. 3 for a traditional fixed-wing aircraft, which is described in greater detail below.

Large cargo payloads that are significantly oversized in a single dimension (e.g., highly elongated payloads) generally result in those payloads, when transported by aircraft, being arranged in the aircraft close to parallel to the direction of travel, and substantially orthogonal to the wing span direction or the height direction of a static aircraft on the ground. In other words, they are carried with the longest dimension being aligned with the longitudinal axis of the aircraft. However, even the longest existing operational aircraft in the world, the Antonov AN-225, which is 84 meters long (about 275 feet) in total length from fuselage nose tip to fuselage tail tip, cannot stow cargo over about 43.6 meters long (about 143 feet), which is just over half of the total length of the AN-225 aircraft. While some smaller cargo aircraft have a larger maximum cargo length ratio, such as about 70% for the Boeing 747-400 (resulting in about 185 feet maximum cargo length), a common feature among these large cargo aircraft is a limited extension of the cargo bay into the aft section of the fuselage. While there may be many reasons for this limited extension and the maximum cargo length, the tailstrike requirement and a resulting reduction in the available volume in the aft fuselage reducing the usefulness of any portion of any extra aft cargo bay volume is likely a significant factor.

Some previous attempts at increasing the tailstrike angle of long-fuselage aircraft have included splicing the fuselage to insert a wedge-shaped transverse frame element that upwardly deflects the fuselage aft of the wedge or increasing the taper on the underside of the aft fuselage, such as described with respect to U.S. Pat. No. 10,093,406, entitled "Aircraft Frame for Tailstrike Angle Enhancement." However, such solutions become problematic as fuselage length and cargo bay diameter increases, among other reasons. For example, a wedge-shaped transverse frame becomes prohibitively large and heavy as the distance between the lower ends of the fuselage connected by the wedge increases, and increasing the taper on the underside of the aft fuselage significantly reduces the useable cargo bay cross-sectional area as the cargo bay is elongated aftwards Accordingly, there is a need for large, transport-category aircraft, capable of moving oversized cargo not traditionally shippable by air.

SUMMARY

Certain examples of the present disclosure include a cargo aircraft fuselage design for extending the useable interior cargo bay length to a significant majority of the length of the fuselage, while still enabling the cargo aircraft to have a tailstrike criteria that allows for typical (or better) takeoff and landing pitch maneuvers. Examples of the present disclosure include extremely large cargo aircraft capable of both carrying extremely long payloads and being able to take off and land at runways that are significantly shorter than those required by most, if not all, existing large aircraft. For purposes of the present disclosure, a large or long aircraft is considered an aircraft having a fuselage length from fuselage nose tip to fuselage tail tip that is at least approximately 60 meters long. The American Federal Aviation Administration (FAA) defines a large aircraft as any aircraft of more than 12,500 pounds maximum certificated takeoff weight, which can also be considered a large aircraft in the present context, but the focus of size is generally related to a length of the aircraft herein. One example of such an oversized payload capable of being transported using examples of this present disclosure are wind turbine blades, the largest of which can be over 100 meters in length. Examples of the present disclosure enable a payload of such an extreme length to be transported within the cargo bay of an aircraft having a fuselage length only slighter longer than the payload, while that aircraft can also take off and land at most existing commercial airports, as well as runways that are even smaller, for instance because they are built at a desired location for landing such cargo aircraft near a site where the cargo is to be used, such as a landing strip built near or as part of a wind farm.

In one exemplary embodiment a cargo aircraft includes a fuselage defining a forward end, an aft end, and a continuous interior cargo bay that spans a majority of the length of the fuselage from the forward end to the aft end. The fuselage includes a forward portion containing a forward region of the continuous interior cargo bay, the forward portion defining a forward centerline along a longitudinal-lateral plane of the cargo aircraft, an aft portion containing an aft region of the continuous interior cargo bay, the aft portion defining an aft centerline extending above the longitudinal-lateral plane of the cargo aircraft, and a kinked portion forming a junction in the fuselage between the forward portion and the aft portion of the fuselage and between the forward and aft regions of the continuous interior cargo bay. The kinked portion contains a transition region of the continuous interior cargo bay and defines a bend angle between the forward centerline and the aft centerline. The kinked portion also includes a forward transverse frame section, an aft transverse frame section, and a plurality of longitudinal structural elements (e.g., stringers) extending between the forward transverse frame section and the aft transverse frame section, with the forward transverse frame section being coupled to an aft end of the forward portion and the aft transverse frame section being coupled to a forward end of the aft portion such that the forward transverse frame section is angled with respect to the aft transverse frame section about a lateral axis of the cargo aircraft. The fuselage also includes a first fixed wing extending from the fuselage in a first direction away from the fuselage and a second fixed wing extending from the fuselage in a second direction away from the fuselage, the second direction being approximately symmetric about a longitudinal-vertical center plane of the cargo aircraft.

In some embodiments, the forward and aft transverse frame sections are ring sections and can, for example, extend completely around the circumference of the fuselage. A major plane of the forward transverse frame section can be approximately perpendicular to the forward centerline. This can include the major plane of the forward transverse frame section being approximately perpendicular to an aft end of the forward centerline and/or a major plane of the aft transverse frame section being approximately perpendicular to a forward end of the aft centerline.

The kinked portion can include one or more additional transverse frame sections between the aft transverse frame section and the forward transverse frame section. At least one of the one or more additional transverse frame sections can intersect one of the aft transverse frame section, the forward transverse frame section, or a different one of the one or more additional transverse frame sections. In some examples, the intersecting at least one of the one or more additional transverse frame sections terminates at the intersection. In some examples, a periphery of the forward transverse frame section can be sized and shaped differently than a periphery of the aft transverse frame section, which can accommodate, for example, a taper of the fuselage that extends along some or all of the kinked portion. In some examples, a cross-sectional area of the periphery of the aft transverse frame section is less than a cross-sectional area of the periphery of the forward transverse frame section.

The cargo aircraft can include an upper wing box that passes through the forward portion of the fuselage and connects the first fixed wing to the second fixed wing. The upper wing box can be located forward of the forward transverse frame section. In at least some such embodiments, an upper wing surface spans across the first fixed wing, the upper wing box, and the second fixed wing. The upper wing surface can include a central portion that spans the upper wing box and defines an airfoil shape that extends vertically above the forward transverse frame section. Additionally, the upper wing surface can include first and second wing portions that span the first and second fixed wings, respectively, and can extend vertically above and below the top of the forward transverse frame section. Further, the kinked portion of the fuselage can define an upper transition surface and the aft portion of the fuselage can define an aft upper surface, and the upper transition surface of the kinked portion can smoothly blend (e.g., with matching curvatures at the intersections or tangency-continuous and having surface curvature whose maximum curvature magnitude is relatively low or comparable to surrounding surfaces such that, at the boundary between two unique surfaces, their normal vectors point in the same direction) the central portion of the upper wing surface with the aft upper surface.

The exterior surface of the kinked portion can define a geometrically smooth transition (e.g., without discontinuities or sharp curvatures, or having tangency continuity.) between an exterior surface of the forward portion and an exterior surface of the aft portion. In some embodiments, the exterior surface of the kinked portion includes a plurality of longitudinal panels that extend from the forward portion to the aft portion. Each of the plurality of longitudinal panels can have complex curvature between an exterior of the forward end and an exterior of the aft portion.

In some embodiments, the cargo aircraft has an high-wing configuration (e.g., where the aircraft wing passes substantially through a region of the fuselage which is above the midway location) with an upper wing surface that extends across the top of the aircraft from the first fixed wing to the second fixed wing, and a central portion of the upper wing surface that can include at least a portion of an exterior surface of the kinked portion. A forward end of the upper transition surface of the kinked portion can tangentially intersect the central portion of the upper wing surface and an aft end of the upper transition surface of the kinked portion can tangentially intersect the aft upper surface. In some embodiments, the forward portion defines a forward lower exterior surface, the kinked portion defines a lower transition surface, and the aft portion defines an aft lower exterior surface. In some such embodiments, the lower transition surface can be geometrically smooth such that the lower transition surface smoothly blends the forward lower exterior surface with the aft lower exterior surface. Additionally, in some such embodiments, a forward end of the lower transition surface of the kinked portion tangentially intersects the forward lower exterior surface and an aft end of the lower transition surface of the kinked portion tangentially intersects the aft lower exterior surface. The lower transition surface can define a curvature that decreases from the forward end to the aft end. In some embodiments, a majority of the lower transition surface is substantially flat with respect to a lateral axis of the cargo aircraft.

An aft end of the aft region of the continuous interior cargo bay can be configured to receive an aft end of an elongated contiguous payload from the forward end of the fuselage to dispose the elongated contiguous payload throughout substantially all of the length of the continuous interior cargo bay (e.g., from a forward end of the cargo bay to an aft end, as defined by either the volume of the cargo bay or the cargo support structure extending therein, such as a rail or support floor). In some embodiments, the continuous interior cargo bay includes a lower support system that extends from the forward end to the aft end of the aft region of the continuous interior cargo bay. The lower support system can be configured to allow translation of the elongated contiguous payload from the forward end to the aft end of the aft region along the lower support system. In some embodiments, the aft end of the aft region of the continuous interior bay extends above an upper outer surface of the forward portion of the fuselage.

The forward end of the fuselage can include a cargo nose door. The cargo nose door can be configured to move to expose an opening into the continuous interior cargo bay through which an aft end of an elongate contiguous payload can be passed throughout substantially all of the length of the continuous interior cargo and to the aft end of the aft region of the continuous interior cargo bay. In some embodiments, the cargo aircraft defines a lateral pitch axis about which the cargo aircraft is configured to rotate a maximal degree during a takeoff operation while the aircraft is still on the ground without striking the fuselage on the ground. The aft portion can extend from the kinked portion at an angle approximately equal to the degree of maximal rotation of the aircraft during the takeoff operation. The bend angle can be approximately in the range of about 4 degrees to about 16 degrees with respect to the longitudinal-lateral plane of the cargo aircraft. In some embodiments, the aft region of the continuous interior cargo bay extends along a majority of a length of the aft portion of the fuselage. The bend angle can be approximately equal to the degree of maximal rotation of the aircraft during the takeoff operation. In some embodiments, the kinked portion is approximately vertically aligned with the lateral pitch axis. In some embodiments, the kinked portion defines a non-symmetrical upward transition along opposed top and bottom outer surfaces of the fuselage. Additionally, at the aft end of the kinked portion, the top outer surface can be angled less than the bottom outer surface with respect to the forward centerline.

The forward region of the continuous interior cargo bay can define a forward cargo centerline approximately parallel to the longitudinal-lateral plane of the cargo aircraft, with the aft region of the continuous interior cargo bay defining an aft cargo centerline extending above the longitudinal-lateral plane of the cargo aircraft and the aft cargo centerline extending along a majority of the aft centerline of the aft portion fuselage. In some embodiments, a length of the aft cargo centerline is at least approximately 25% of a length of a centerline of the continuous interior cargo bay. At least a majority of the kinked cargo centerline can be approximately aligned with the aft centerline. In some embodiments, at least a majority of at least one of the aft cargo centerline or the aft centerline is angled approximately in the range of about 6 degrees to about 12 degrees with respect to a ground plane when the cargo aircraft is fully resting on the ground. In some embodiments, at least a majority of the length of at least one of the aft cargo centerline or the aft centerline is angled approximately equal to or greater than a maximal takeoff angle of the cargo aircraft with respect to a ground plane when the cargo aircraft is fully resting on the ground. Approximately all of the length of at least one of the aft cargo centerline or the aft centerline can be angled approximately equal to or greater than the maximal takeoff angle of the cargo aircraft with respect to a ground plane when the cargo aircraft is fully resting on the ground. The continuous interior cargo bay can define a maximum payload length, and the aft cargo centerline can define a length at least approximately 30% of the maximum payload length. In some embodiments, a length of the aft portion of the fuselage is at least about 25% of the length of the fuselage. In some embodiments, the length of the fuselage is greater than 84 meters, and the continuous interior cargo bay defines a maximum payload length of at least about 70 meters. In some embodiments, the aft portion of the fuselage includes a plurality of circumferentially disposed structural elements oriented orthogonally along the aft centerline.

Another exemplary embodiment of the present disclosure is a cargo aircraft that includes a fuselage defining a forward end, an aft end, and a continuous interior cargo bay that spans a majority of a length of the fuselage from the forward end to the aft end. The fuselage includes a forward portion containing a forward region of the continuous interior cargo bay, the forward portion defining a forward centerline along a longitudinal-lateral plane of the cargo aircraft, an aft portion containing an aft region of the continuous interior cargo bay, the aft portion defining an aft centerline extending above the longitudinal-lateral plane of the cargo aircraft, and a kinked portion. The kinked portion forms a junction in the fuselage between the forward portion and the aft portion of the fuselage and between the forward and aft regions of the continuous interior cargo bay. The kinked portion contains a transition region of the continuous interior cargo bay and defines a bend angle between the forward centerline and the aft centerline. The aircraft also includes a first fixed wing that extends from the fuselage in a first direction away from the fuselage and a second fixed wing that extends from the fuselage in a second direction away from the fuselage, with the second direction being approximately symmetric about a longitudinal-vertical center plane of the cargo aircraft. Additionally, the cargo aircraft has an upper wing configuration with an upper wing surface that extends across the top of the aircraft from the first fixed wing to the second fixed wing. A central portion of the upper wing surface includes at least a portion of an exterior surface of the kinked portion.

In some embodiments, the kinked portion includes a forward end, an aft end, and a plurality of longitudinal frame elements that extend between the forward end and the aft end, the forward end being adjacent to the forward portion and the aft end being adjacent to the aft portion such that the forward end is angled with respect to the aft end about a lateral axis of the cargo aircraft.

The cargo aircraft can further include an upper wing box that passes through the forward portion of the fuselage and connects the first fixed wing to the second fixed wing. The upper wing box can be located forward of the kinked portion. In some embodiments, a periphery of the forward end of the kinked portion is sized and shaped differently than a periphery of the aft end of the kinked portion. In some embodiments, a cross-sectional area of the periphery of the aft end of the kinked portion is less than a cross-sectional area of the periphery of the forward end of the kinked portion.

The cargo aircraft can further include an upper wing box that passes through the forward portion of the fuselage and connects the first fixed wing to the second fixed wing. The upper wing box can be located forward of the forward end of the kinked portion. In at least some such embodiments, an exterior surface of the kinked portion defines a geometrical smooth transition between an exterior surface of the forward portion and an exterior surface of the aft portion. The exterior surface of the kinked portion can include a plurality of longitudinal panels that can extend from the forward portion to the aft portion. Each of the plurality of longitudinal panels can have complex curvature between an exterior of the forward end and an exterior of the aft portion.

In some embodiments, the upper wing surface spans across the first fixed wing, the upper wing box, and the second fixed wing. A central portion of the upper wing surface can span the upper wing box and can define an airfoil shape that extends vertically above the forward end of the kinked portion. Further, first and second wing portions of the upper wing surface can span the first and second fixed wings, respectively, and can extend vertically above and below the forward end of the kinked portion. The kinked portion of the fuselage can define an upper transition surface and the aft portion of the fuselage defines an aft upper surface, and the upper transition surface of the kinked portion can smoothly blend the central portion of the upper wing surface with the aft upper surface.

In some embodiments, a forward end of the upper transition surface of the kinked portion tangentially intersects the central portion of the upper wing surface and an aft end of the upper transition surface of the kinked portion tangentially intersects the aft upper surface. The forward portion can define a forward lower exterior surface, the kinked portion can define a lower transition surface, and the aft portion can define an aft lower exterior surface. Further, the lower transition surface can be geometrically smooth such that the lower transition surface smoothly blends the forward lower exterior surface with the aft lower exterior surface. Additionally, in at least some such embodiments, a forward end of the lower transition surface of the kinked portion can tangentially intersect the forward lower exterior surface and an aft end of the lower transition surface of the kinked portion can tangentially intersect the aft lower exterior surface. In some embodiments, the lower transition surface defines a curvature that decreases from the forward end to the aft end. In some embodiments, a majority of the lower transition surface is substantially flat with respect to a lateral axis of the cargo aircraft.

BRIEF DESCRIPTION OF DRAWINGS

This disclosure will be more fully understood from the following detailed description taken in conjunction with the accompanying drawings, in which:

FIG. 4A is a side view of an alternative exemplary embodiment of an aircraft;

FIG. 4B is a side transparent view of the aircraft of FIG. 4A;

FIG. 10A is a schematic side view of one exemplary embodiment of a cargo aircraft fuselage showing two transverse frame sections that define a kinked region;

FIG. 10B is a close-up schematic side view of the kinked region of the cargo aircraft fuselage of FIG. 10A;

FIG. 10C is a schematic front view comparative illustration of the two transverse frame sections that define the kinked region of the cargo aircraft fuselage of FIG. 10A;

DETAILED DESCRIPTION

Figure 1A:
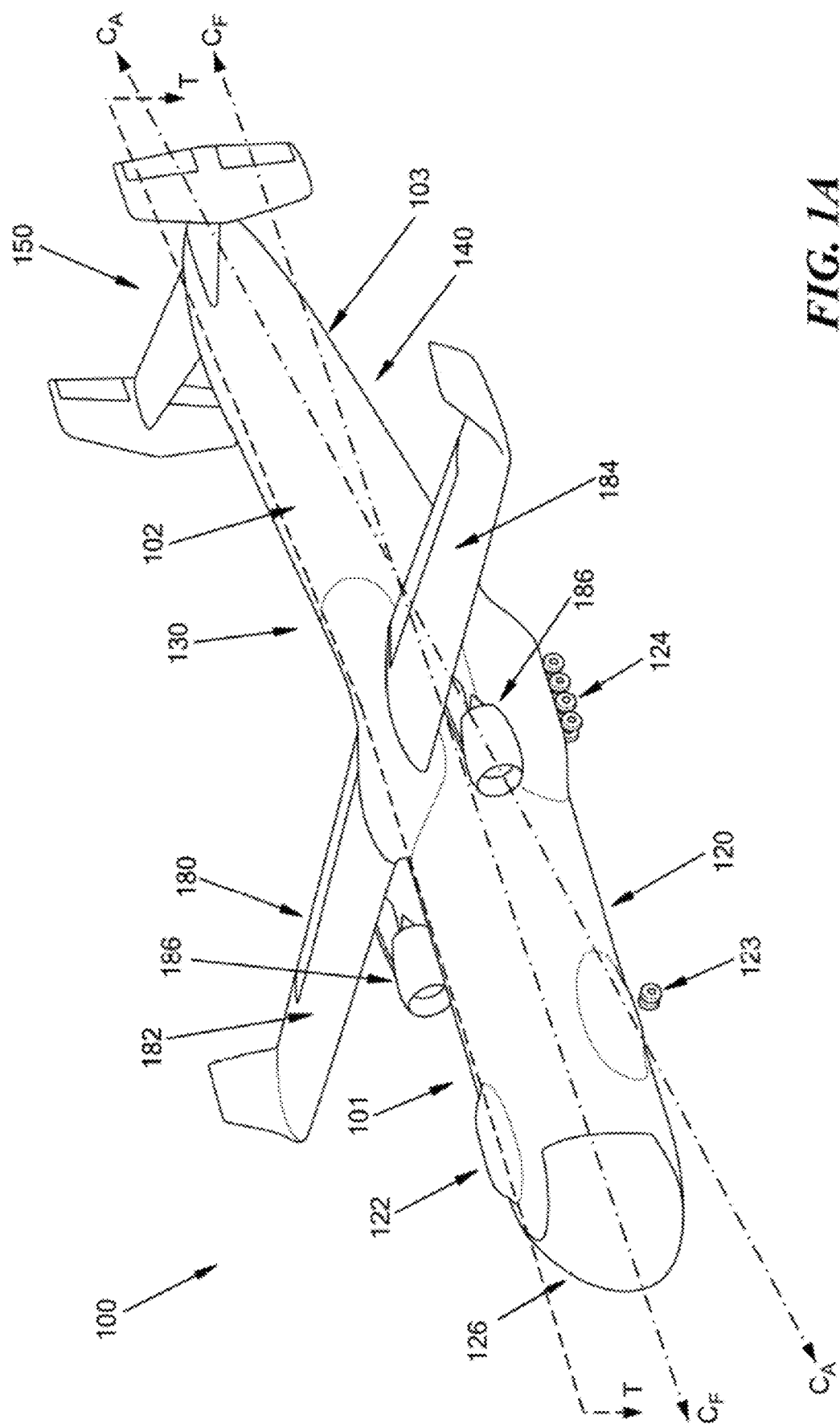
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward" and "aft," and will give terms of those nature their commonly understood meaning. Further in some instances, terms like forward and proximal or aft and distal may be used in a similar fashion.

The present disclosure is related to large, transport-category aircraft (e.g., fixed-wing, non-bouyant, and multi-engine jet aircraft), capable of moving oversized cargo not traditionally shippable by air. For example, wind turbine blades, which are typically highly elongated and irregular in shape in order to provide greater electrical power generating efficiency, or similarly long industrial equipment, shipping containers, or military equipment. The present disclosure is not limited to these specific cargos or payloads, but rather, these are examples. Example of the present disclosure include extremely long cargo aircraft (e.g., longer than 60 meters, or even longer than 84 meters) with a kink in their fuselage about the lateral pitch axis, which allows the transportation of very long payloads or cargos while also meeting the tail strike requirement by allowing the cargo to extend longitudinally aft and upwards to locations which are vertically above the upper surface of the forwards fuselage.

Fixed-wing aircraft traditionally meet their tail strike requirement by including an upsweep angle on the lower surface of the aft fuselage. The tailstrike requirement can then be expressed mathematically by observing that to avoid the fuselage tail from striking the ground during takeoff rotation or landing flare, the ground static height of the aircraft fuselage aft tip on flat ground must be larger than the length of aircraft fuselage aft of the rotation point along the aircraft length direction, times the sine of the upsweep angle, plus the height of the rotation point. This is a simplification that applies only at the aft fuselage tail tip, but the requirement applies for all locations aft of the rotation point along the aircraft length direction.

Additionally, to allow takeoff rotation, fixed-wing aircraft main landing gear are generally positioned in the middle of the aircraft. This is because the aircraft must be able to both balance on the landing gear on the ground at static conditions while achieving a takeoff rotation. During takeoff rotation aircraft rotate about a rotation point that coincides with the aft-most main landing gear location, and a rotation axis that passes through this point that is parallel to the wing span direction, and orthogonal to the aircraft length direction and the aircraft height direction. As an aircraft configuration must grow longer to accommodate long payloads or cargos, the tail strike requirement becomes increasingly onerous because the vertical clearance required at the aft tip of the fuselage grows proportionally to the length of aircraft aft of the main landing gear rotation location.

However, even for configurations with very long fuselage lengths, aspects of the present disclosure enable the tailstrike requirement to be met by inserting a distinct fuselage kink, or a relatively sharp change in the direction of the fuselage length direction, between the forwards and aft ends of the fuselage, resulting in an angle measured on aircraft centerline between the forwards fuselage length direction and the aft fuselage length direction. This is illustrated in FIGS. 1A and 1B.

Aircraft

Figure 1B:
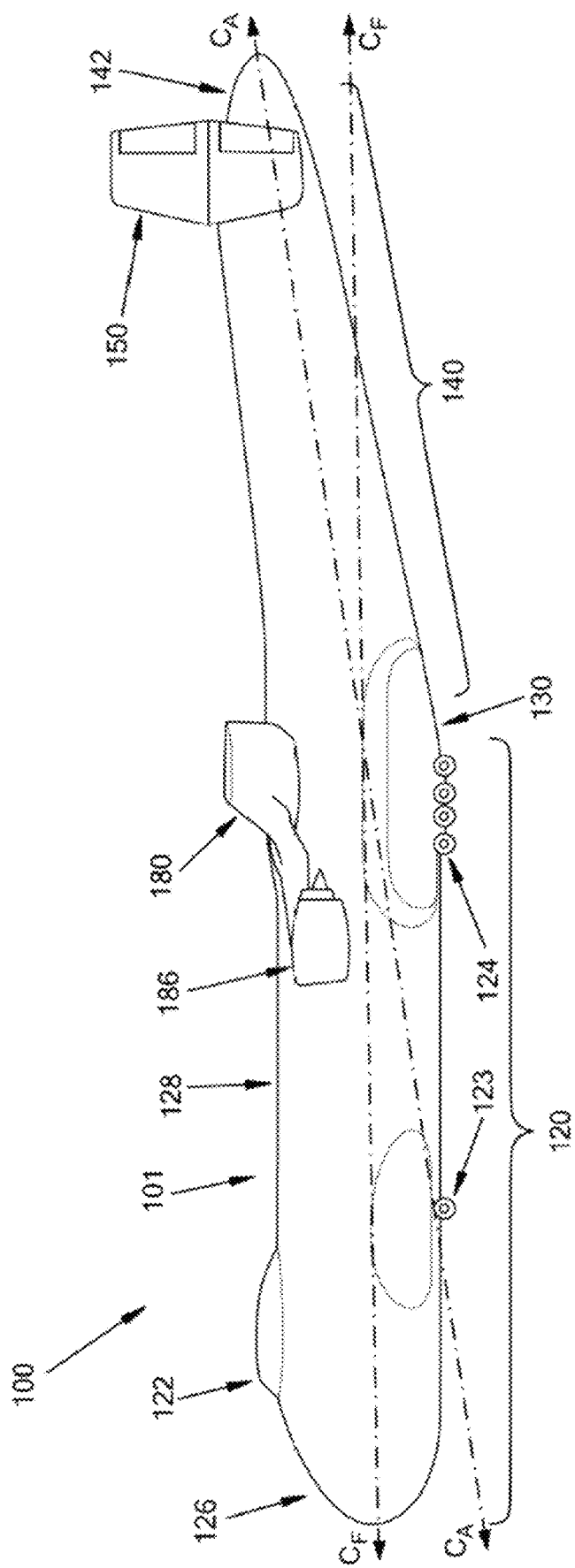
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D, 6B-6D, and 8A. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 8A-9.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
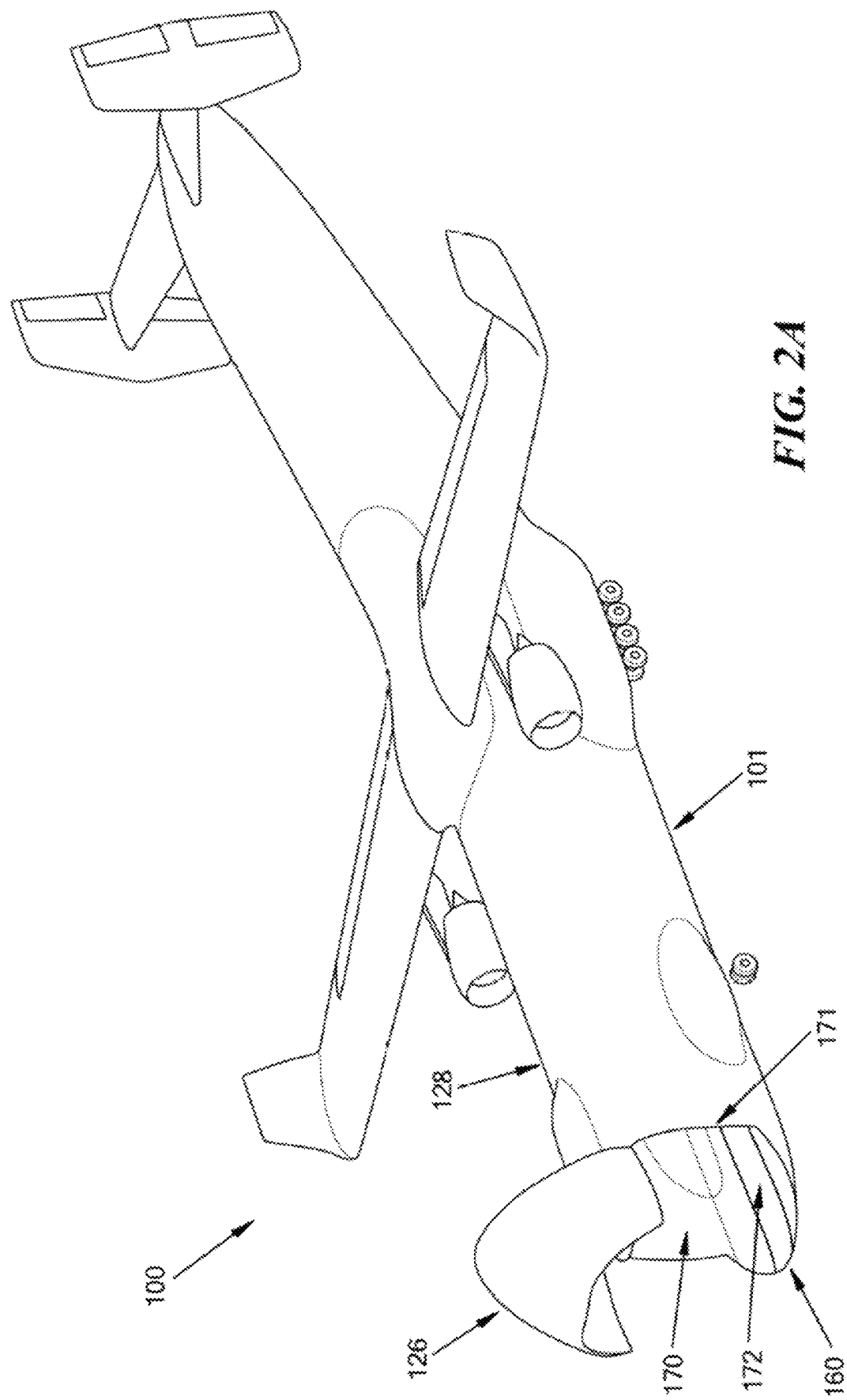
FIG. 2A is an isometric view of the aircraft of FIG. 1A with a nose cone door in an open position to provide access to an interior cargo bay of the aircraft.
Figure 2B:
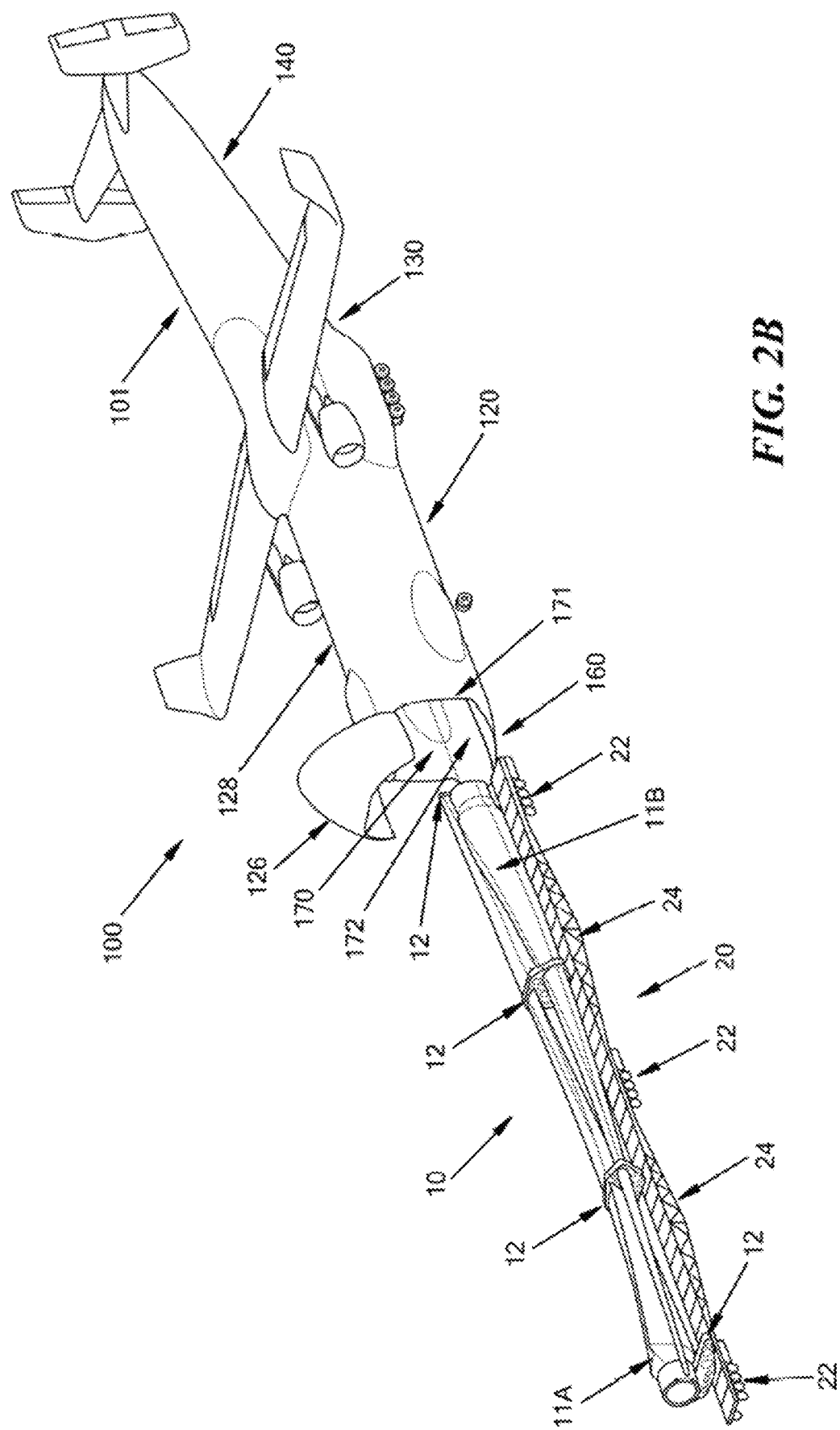
FIG. 2B is an isometric view of the aircraft of FIG. 2A with a payload being disposed proximate to the aircraft for loading into the interior cargo bay.
Figure 2C:
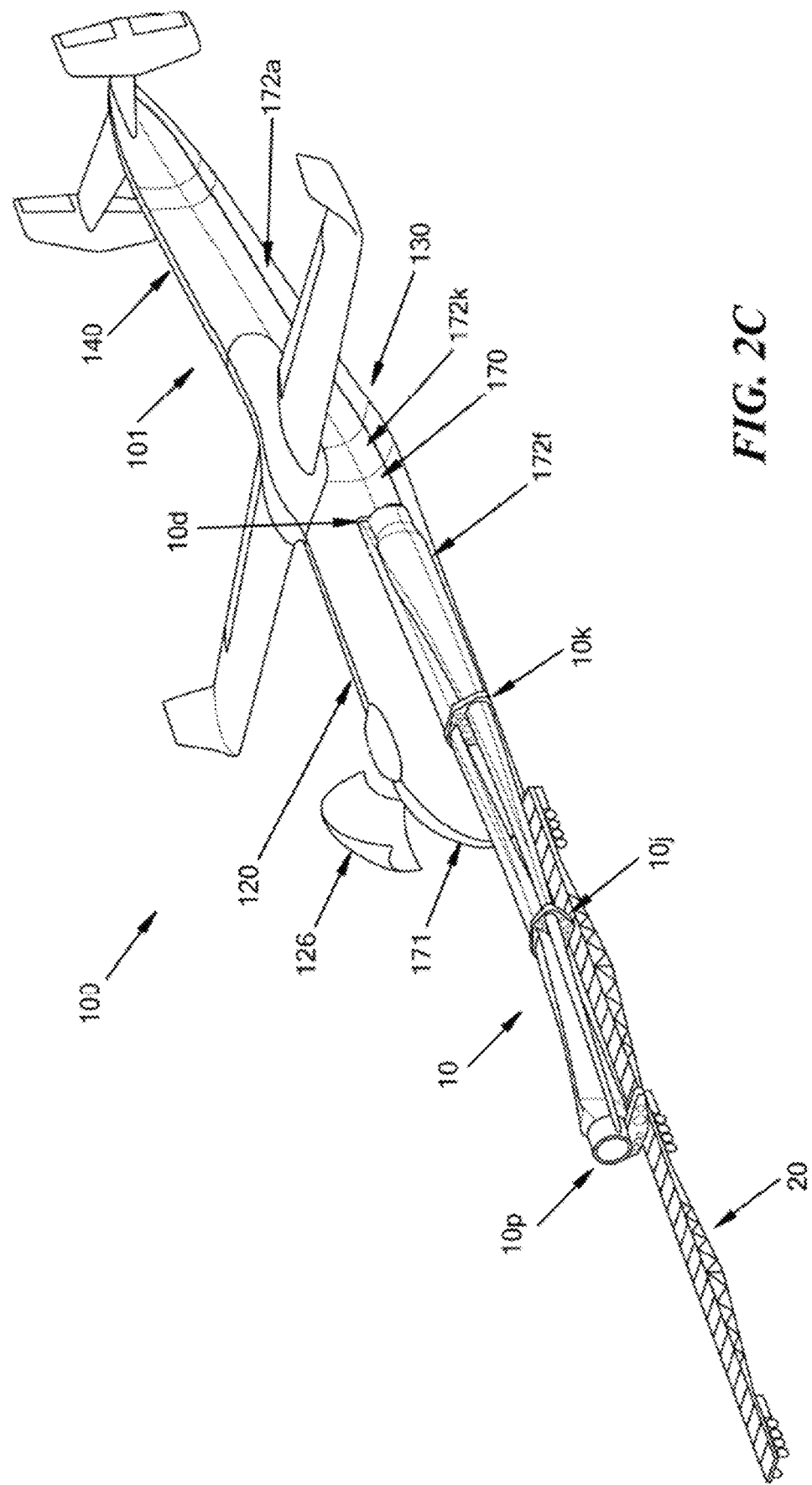
FIG. 2C is an isometric, partial cross-sectional view of the aircraft of FIG. 2B with the payload being partially loaded into the interior cargo bay.
Figure 2D:
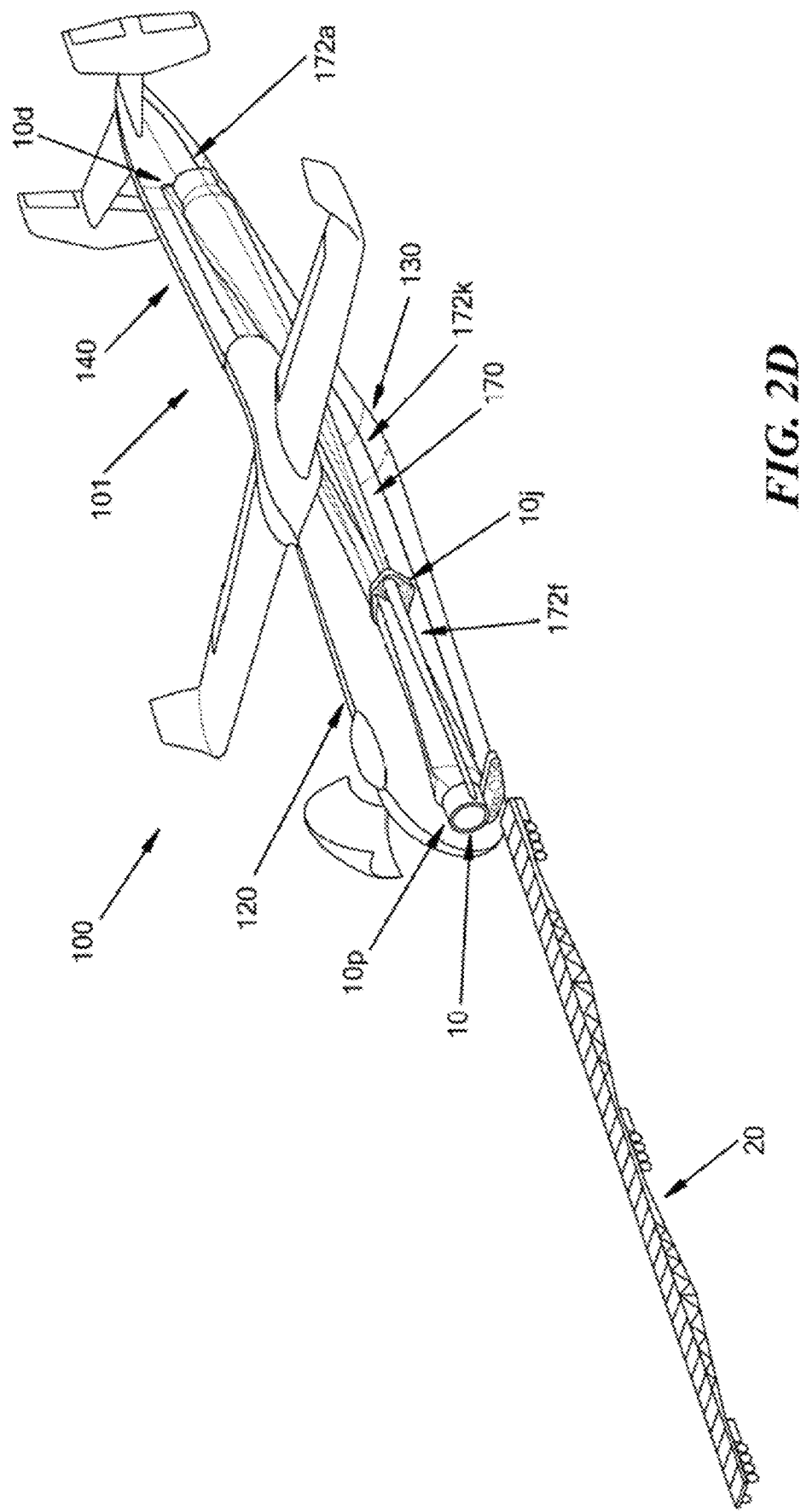
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10d of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10d of the payload 10 is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10p, 10d extends from the forward end 120, through the kinked portion 130, and into the aft end 140. As shown, the only contact points with a floor of the interior cargo bay 170 (which for these purposes includes the tongue 160) are at the proximal and distal ends 10p, 10d of the payload 10 and at two intermediate points 10j, 10k between the proximal and distal ends 10p, 10d, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in commonly-owned applications, or otherwise known to those skilled in the art.

Kinked Fuselage

Figure 3:
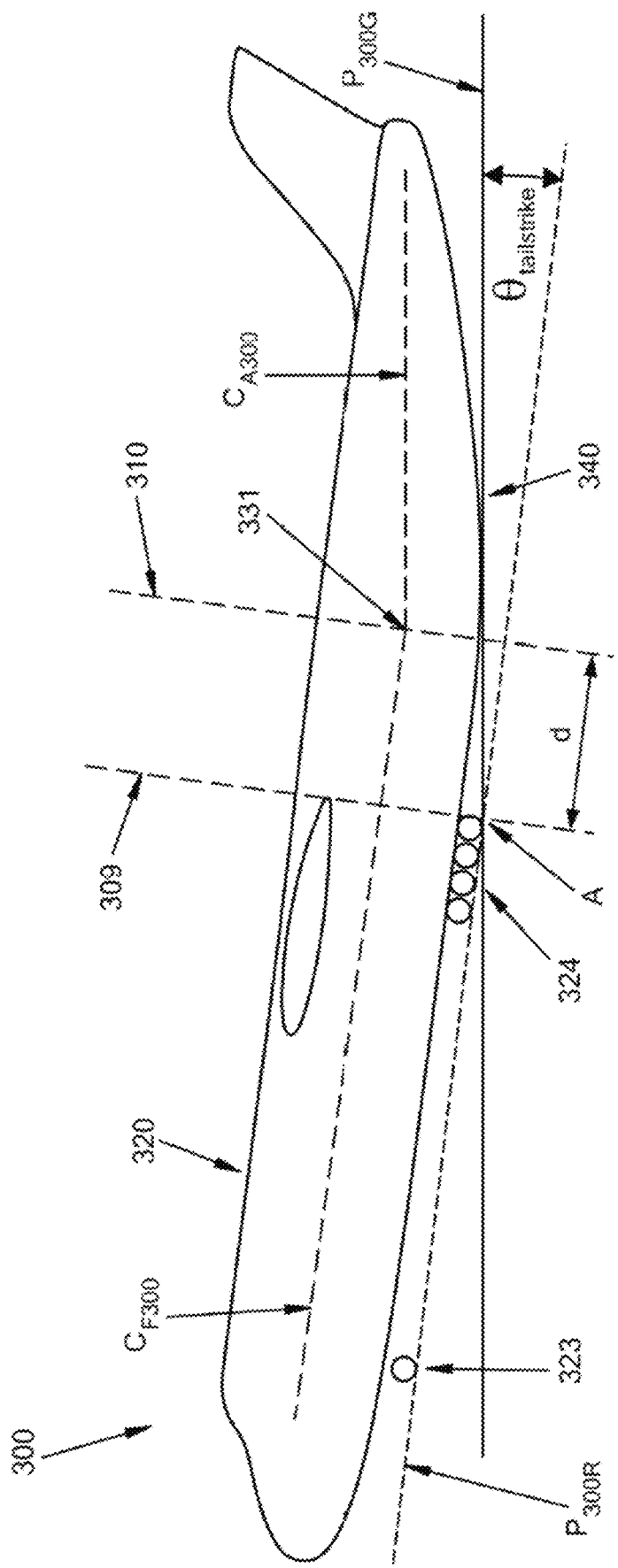
FIG. 3 is a schematic side view of an aircraft in the prior art, illustrating a lateral axis of rotation with respect to tail strike.

FIG. 3 is an illustration of a prior art aircraft 300 during a takeoff pitch-up maneuver showing the calculating of a tailstrike angle ($\theta_{tailstrike}$), which is determined when a forward end 320 of the aircraft 300 is lifted away from the ground $P_{300G}$ (e.g., a runway of an airport) and an aft end 340 and tail of the aircraft 300 is pushed towards the ground 50 until contact. This change occurs during a takeoff pitch-up maneuver when the aircraft 300 pitches (e.g., rotates) about a lateral axis of rotation, indicated as "A" in FIG. 3. This lateral axis of rotation, A, is typically defined by the main landing gear 324, which acts as a pivot point to allow a downwards force generated by the tail to lift the forward end 320 of the aircraft 300. In FIG. 3, the nose landing gear 323 and main landing gear 324 of the aircraft 300 define a resting plane $P_{300R}$ (e.g., plane horizontal with the ground plane $P_{300G}$ when the aircraft is resting), such that the tailstrike angle $\theta_{tailstrike}$ can be defined by the change in the angle of the ground plane $P_{300G}$ with respect to the resting plane $P_{300R}$ when the aircraft 300 has achieved a maximal pitch angle or takeoff angle, which occurs just before any part of the aft end 340 of the aircraft 300 strikes the ground. In FIG. 3, a forward center line $C_{F300}$ of the aircraft 300 is shown, along with an aft centerline $C_{A300}$, which extends to the aft end 340 of the aircraft 300. In order to increase $\theta_{tailstrike}$, larger aircraft 300 usually have an upsweep to the lower surface of an aft region of the aft fuselage. This upsweep deflects the centerline $C_{A300}$ with respect to the forward center line $C_{F300}$ at the initiation of the upsweep, which is shown in FIG. 3 as a bend 331 in the centerlines $C_{F300}$, $C_{A300}$. In prior art aircraft 300, this bend 331 occurs a certain distance, shown in FIG. 3 as distance "d" aft of the lateral axis of rotation A. Longer values of distance "d" increase the constant cross-section length of the aircraft 300, which can, depending on the type of aircraft, extend the length of a passenger cabin and/or increase the length of the cargo bay, and thus the ability to carry cargo of an increased maximum length. Aspects of the present disclosure eschew this prior art incentive for increasing distance "d" and instead significantly reconfigure the relationship between the aft fuselage and forward fuselage such that decreasing distance "d" can result in increasing the maximum usable cargo bay length, as explained in more detail below.

FIG. 4A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle $\alpha_{400K}$ of the aft fuselage 440. The kink location 431 is contained in the kinked portion 430 disposed between and connecting the forward and aft ends 420, 440. FIG. 4B shows the forward centerline $C_{F400}$ as being an approximate midpoint between a top-most outer or upper surface 402f and a bottom-most outer or lower surface 403f of the fuselage 401 forward of a lateral axis of rotation A', with the aft centerline $C_{A400}$ being an approximate midpoint between an upper surface 402a and a lower surface 403a of the fuselage 401 aft of the lateral axis of rotation. FIG. 4B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402a, 403a extending aft from the kink 431, such that the fuselage 401 aft of the kink 431 has a substantial portion of an approximately constant height or cross-sectional area. This represents only one example, and in other instances the upper surface 402a does not necessarily extend approximately parallel to the lower surface 402b at all even if the aft fuselage still defines a kink 431 in the centerline.

In FIG. 4B, the angle of the aft centerline $C_{A400}$ with respect to the forward centerline $C_{F400}$ defines a kink or bend angle (illustrated as $\alpha_{400K}$ in FIG. 4A), which can be approximately equal to average of an angle $\alpha_{upper}$ of the after upper surface e 402a and an angle $\alpha_{lower}$ of the lower surface 403a with respect to the forward centerline $C_{F400}$ and forward upper and lower surfaces 402f, 403f for the case of a constant cross-section forward fuselage 401, as shown in FIG. 4B (hence, FIG. 4B indicating the upper and lower surfaces 402a, 403a defining the respective upper and lower angles $\alpha_{upper}$, $\alpha_{lower}$). In some instances, the angles $\alpha_{upper}$, $\alpha_{lower}$ of the aft upper and lower surfaces 402a, 403a vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle $\alpha_{lower}$, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal—lateral plane of the cargo aircraft 100, i.e., a plane in which the forward centerline $C_{F400}$ is disposed, the plane extend substantially parallel to the ground or a ground plane $P_{400G}$. Further, the kink angle $\alpha_{400K}$ can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 4C:
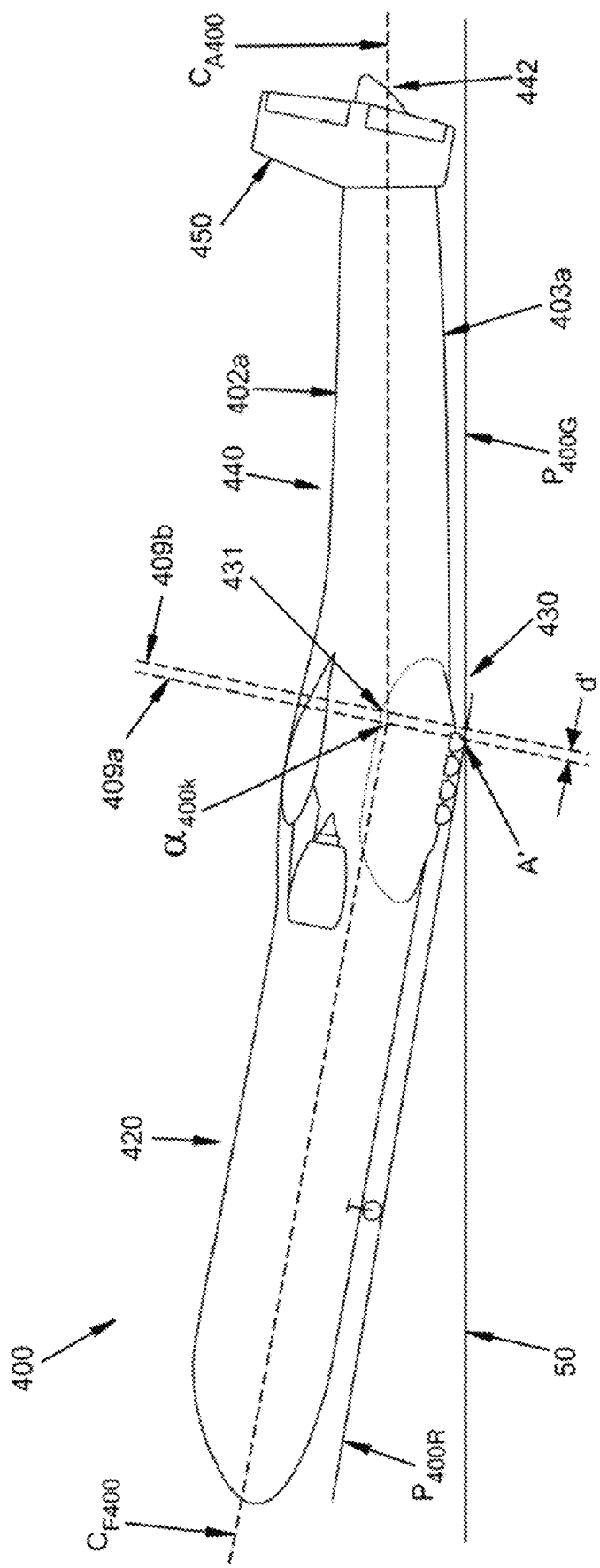
FIG. 4C is a side view of the aircraft of FIG. 4B in a take-off position.
Figure 5A:
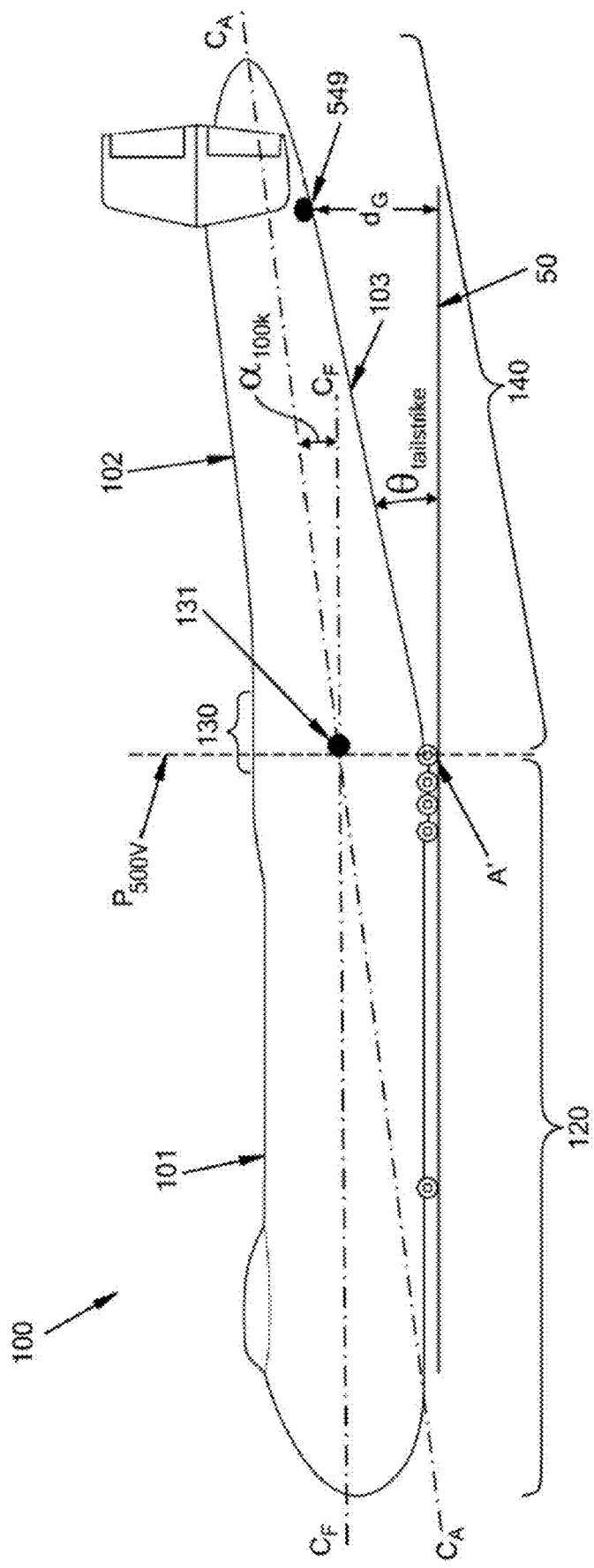
FIG. 5A is the side view of the aircraft of FIG. 1A with some additional details removed for clarity.

In FIG. 4C, the cargo aircraft 400 is shown on the ground 50 and rotated about the lateral axis of rotation to illustrate, for example, a takeoff pitch-up maneuver. In FIG. 4C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 4C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 5A shows this in further detail for the cargo aircraft 100 of FIG. 1A.

In FIG. 5A, the aft centerline $C_A$ and forward centerline $C_F$ of the fuselage 101 are shown intersecting at a kink location 131 just aft of the vertical plane $P_{500V}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha_{100K}$ defined by the upslope of the aft centerline $C_A$ with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

As explained in more detail below, vertically aligning the kink location 131 with the lateral pitch axis can enable the aft fuselage 140 to extend without decreasing $O_{tailstrike}$, which also can enable the useable portion of the interior cargo bay 170 to extend aft along a substantial portion of the aft fuselage 140. Further, the present designs can enable the creation of extremely long aircraft designs capable of executing takeoff and landing operations with shorter runway lengths than previously possible. These lengths can be the equivalent of existing typical runway lengths, or even shorter, which is surprising for an airplane that is longer. Runway lengths approximately in the range of about 500 meters to about 1000 meters are likely possibly in view of the present disclosures, as compared to existing runways, which are about 2000 meters for standard aircraft and about 3000 meters for larger aircrafts. Thus, the engineering related to the aircraft 100, 400, and other embodiments of aircraft derivable from the present disclosures, enable extremely large aircraft that can be used on runways that are the smaller than runways for aircraft that are considered to be large aircraft due, at least in part, to the designs enabling increased pitch angles without causing tailstrike.

A further advantage provided by the present designs is being able to maintain the location of the center-of-gravity of the aircraft close to the lateral pitch axis, which minimizes the downforce required by the tail to rotate the aircraft during takeoff. This minimization of necessary downforce allows pitch-up maneuvers to occur at slower speeds, thereby increasing the available angle of attack (and thus lift) able to be generated at a given speed, which in turn reduces the speed necessary to generate enough lift to get the aircraft off the ground. This advantage is not achievable in prior art designs that attempt to increase their cargo length efficiency (e.g., maximum linear payload length as a function of overall fuselage length) at least because: (1) a reduction in tailstrike angle as the aft fuselage is elongated aft of the lateral rotation axis (e.g., in designs with an aft fuselage bend location being a substantial distance from their lateral axis of rotation); (2) a reduced ability to complete a pitch-up maneuver at low-speeds if the lateral pitch axis is moved aft of the center-of-gravity of the aircraft to accommodate the elongated fuselage, necessitating a substantial increase in wing and/or tail size to achieve the takeoff lengths equal to aircraft designs having lateral pitch axis closer to their center-of-gravity; and/or (3) a reduction in the cargo bay diameter as the aft end of the cargo bay is extended further toward the tail.

Figure 5B:
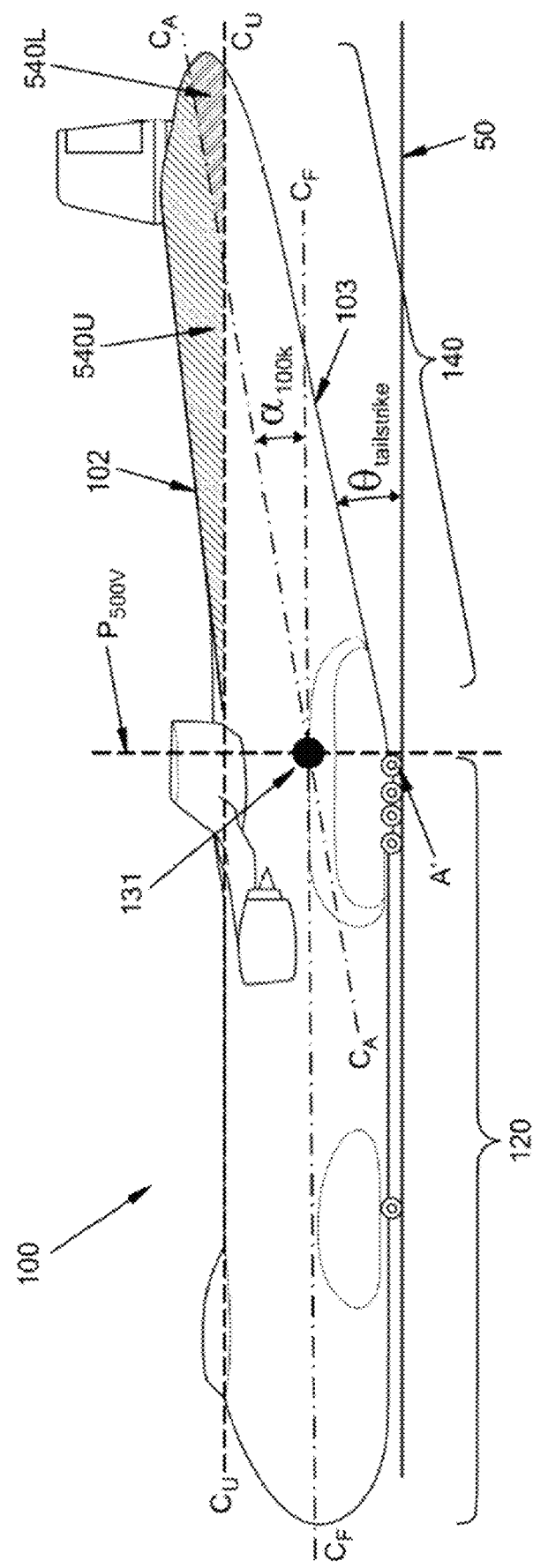
FIG. 5B is the side view of the aircraft of FIG. 1A showing the vertical extension of the aft fuselage above the forward portion of the fuselage.

FIG. 5B shows the vertical extension of the aft fuselage 140 above the forward portion 120 of the fuselage 101. In FIG. 5B, a line $C_u$ is drawn showing the approximately horizontal extension of the upper surface of the forward portion 120 of the fuselage 101. A substantial portion of the aft portion 140 of the fuselage extends above this line $C_u$. This includes an upper portion 540U of the aft portion 140 that is above both the line $C_u$ and the aft centerline $C_A$ and a lower portion 540L that is above the both the line $C_u$ and below the aft centerline $C_A$. The size of the upper and lower portions 540U, 540L depends on the kink angle $\alpha_{100K}$, the length of the aft portion 140, and one or both of the upper and lower angles $\alpha_{upper}$, $\alpha_{lower}$, as these together define the kink angle $\alpha_{100K}$ and the height of the of the aft portion 140 as it extends to the aft end. In some examples, a substantial portion of both the upper and lower portions 540U, 540L is occupied by a portion of the interior cargo bay 170.

Figure 6A:
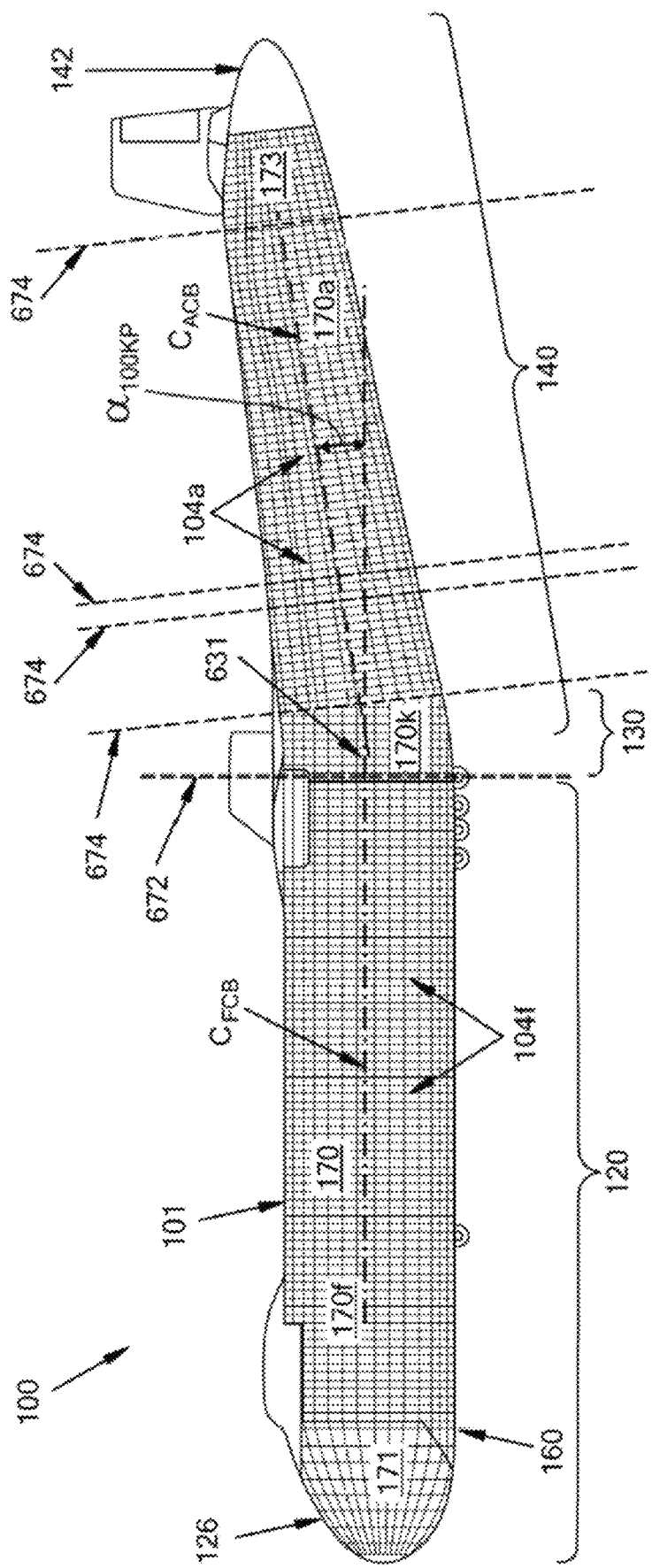
FIG. 6A is a side cross-sectional view of the aircraft of FIG. 5A, including an interior cargo bay of the aircraft.

FIG. 6A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 5A) and the aft region 170a can generally define an aft cargo centerline $C_{ACB}$ that can be substantially colinear or parallel to the aft fuselage centerline $C_A$ (shown in FIG. 5A). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{AGB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

FIG. 6A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 6A) is forward or aft of the fuselage kink 131 (FIG. 5A) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIGS. 6B and 6C.

Figure 6B:
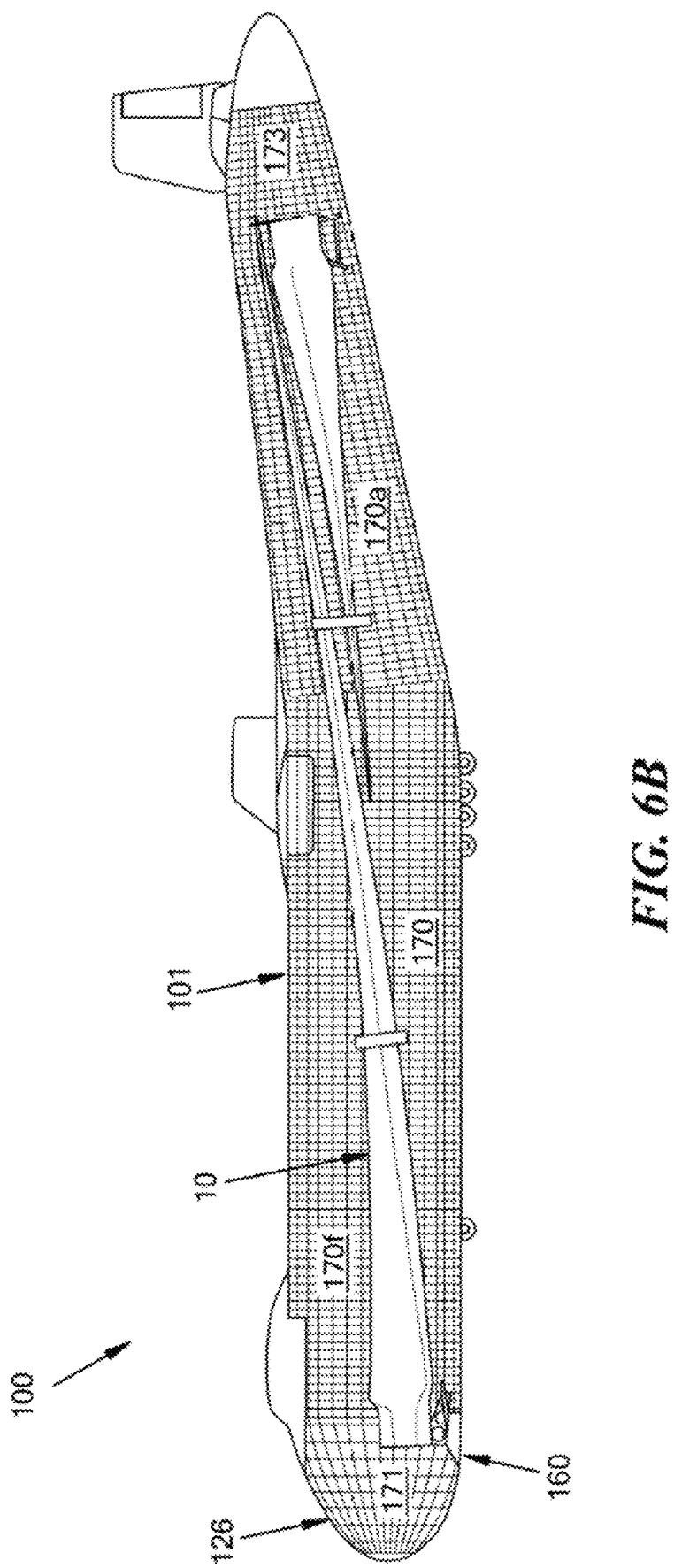
FIG. 6B is the side cross-sectional view of the aircraft of FIG. 6A with an exemplary payload disposed in the interior cargo bay.

FIG. 6B shows a side cross-sectional view of the fuselage 101 of the cargo aircraft 100 of FIG. 6A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Figure 6C:
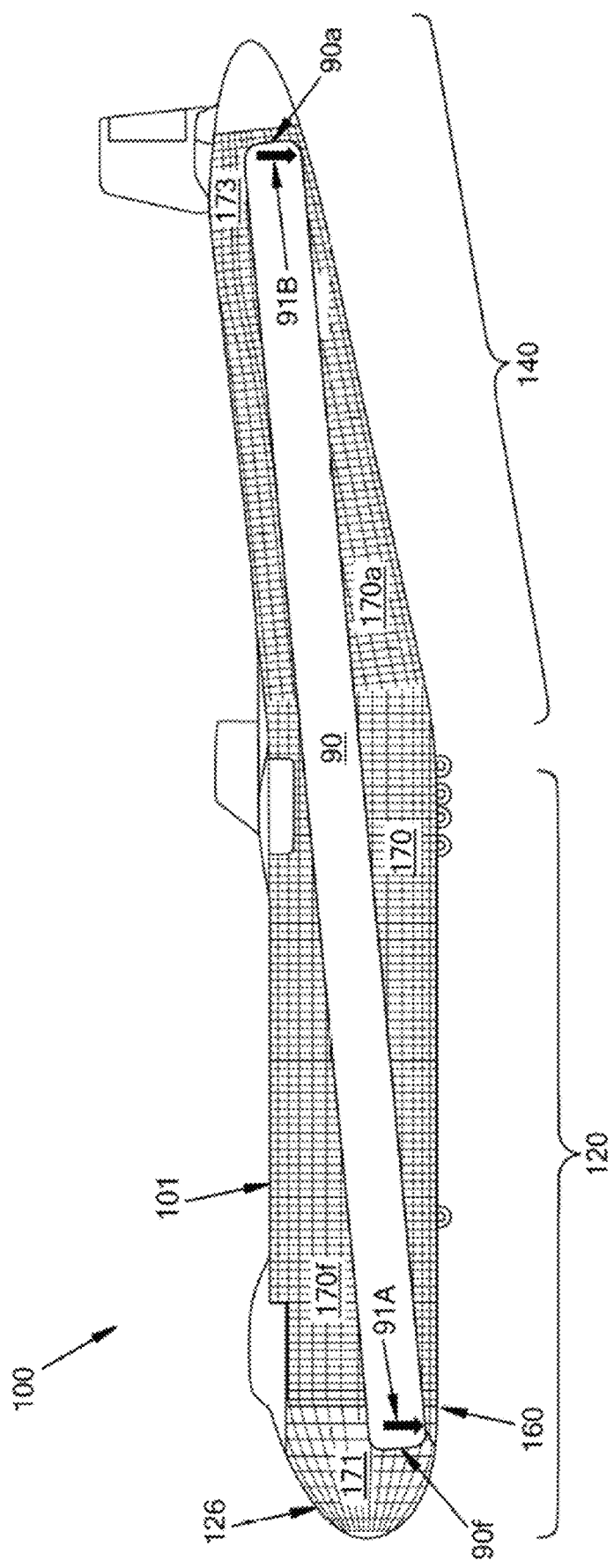
FIG. 6C is the side cross-sectional view of the aircraft of FIG. 6A with a schematic of an exemplary maximum-length payload disposed in the interior cargo bay.

FIG. 6C is the same cross-sectional view of the fuselage 101 of the cargo aircraft 100 of FIG. 6B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Figure 6D:
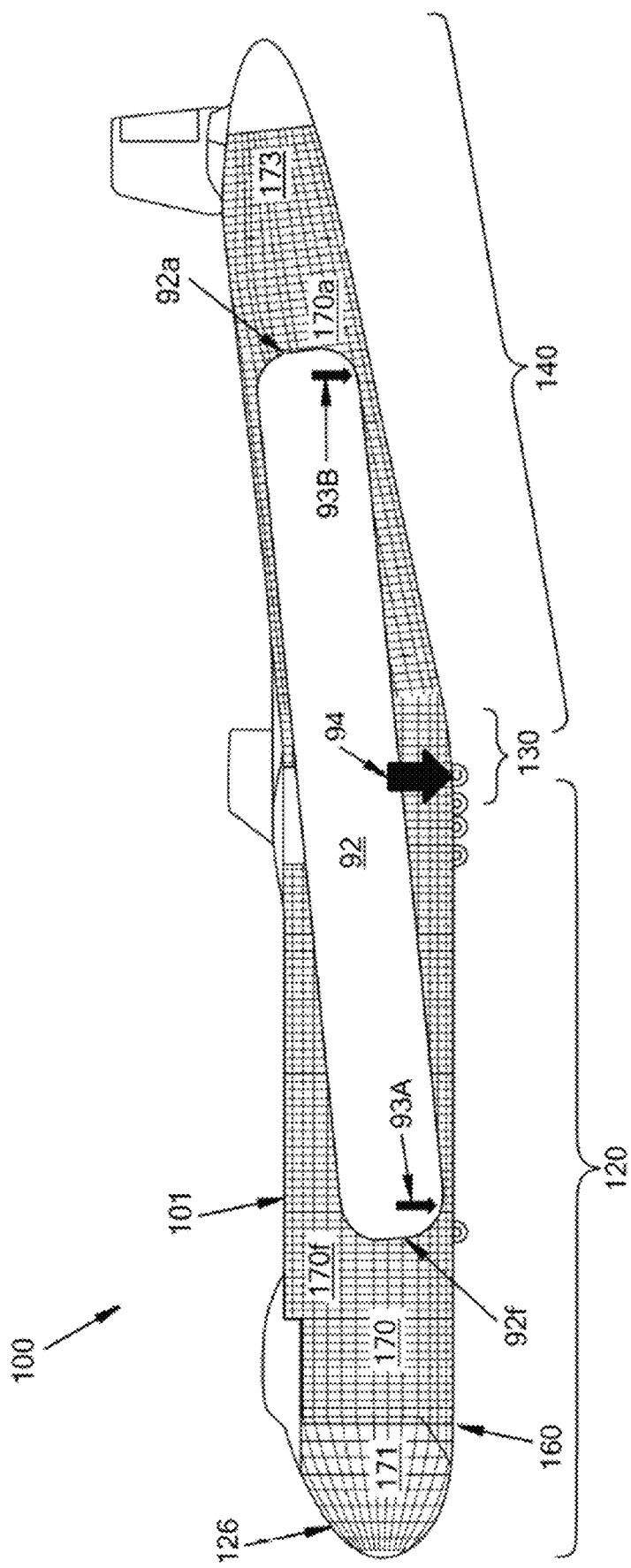
FIG. 6D is the side cross-sectional view of the aircraft of FIG. 6A with a schematic of an exemplary maximum-weight payload disposed in the interior cargo bay of the aircraft.

FIG. 6D is the same cross-sectional view of the fuselage 101 of the cargo aircraft 100 of FIG. 6A with a maximum weight payload 92 secured in the cargo bay 170. A forward end 92f of the maximum weight payload 92 can be secured in the forward region 170f of the interior cargo bay 170 with a first portion of the weight of the payload 92 (shown as vector 93A) being carried by the forward fuselage 120 and an aft end 92a of the maximum weight payload 92 can be secured in the aft region 170a of the interior cargo bay 170 with a second portion of the weight of the payload 92 (shown as vector 93B) being carried by the aft fuselage 140. Advantageously, the substantial length of the cargo bay 170 forward and aft of the a center-of-gravity of the aircraft 100 (e.g., approximately aligned with the kinked region 130) enables positioning of the maximum weight payload 92 such that the payload center-of-gravity (shown as vector 94) substantially close (i.e., within about 30% of wing Mean Aerodynamic Cord (MAC) or about 4% of total aircraft length) to or aligned with the center-of-gravity of the aircraft 100. In some examples, at least about 10% of the weight of maximum weight payload 92 is carried in the aft region 170a. In some examples of carrying a maximum weight payload, especially payloads approaching a maximum length, about 40% to about 50% could be carried in the aft region 170a in order to center the payload's center of gravity at a nominal location in the cargo bay 170.

Figure 7:
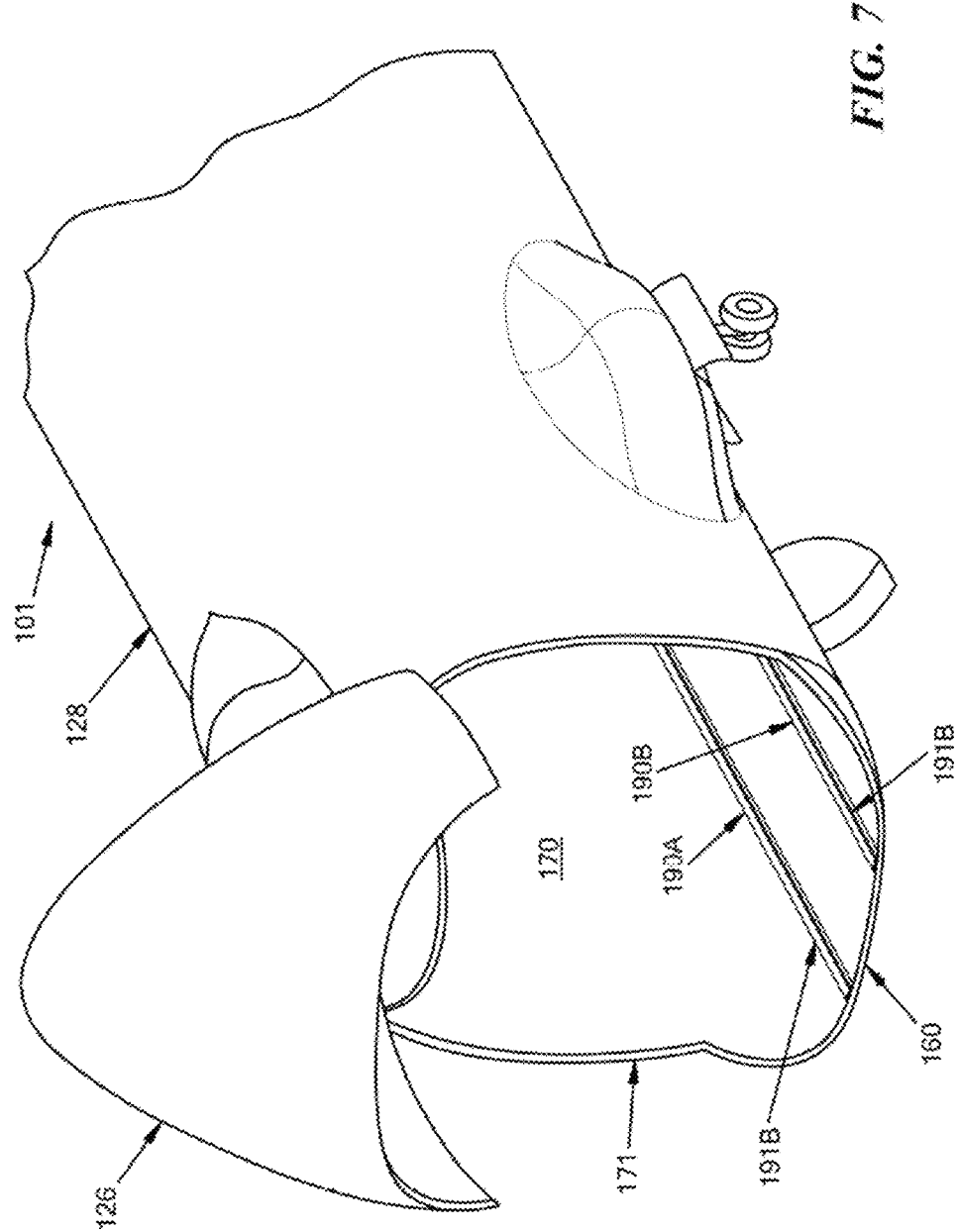
FIG. 7 is an isometric view of the aircraft of FIG. 6A illustrating a lower support system that extends along the interior cargo bay from a forward entrance to an aft section of the interior cargo bay in an aft portion of a fuselage of the aircraft.

FIG. 7 is a perspective view of the cargo aircraft 100 of FIG. 6A showing a lower support system 190A, 190B that extends along the cargo bay 170 from a forward entrance 171 to and through the aft section 170a (not visible) of the cargo bay 170 in the aft portion 140 (not visible) of the fuselage 101. The lower support system 190A, 190B can include forward portions 191A, 191B that extend forward along the cantilevered tongue 160 as well. In some examples, the lower support system 190A, 190B includes rails or tracks, or similar linear translation components, that enable a payload to be translated into the cargo bay 170 and all the way to the aft end of the aft region 170a of the cargo bay 170 from the cargo opening 171, for instance by having the lower support system 190A, 190B extend through nearly an entire length of the fixed portion 128 of the fuselage 101. In some examples, the lower support system 190A, 190B can be used to support and/or the payload during flight such that the lower support system 190A, 190B can hold substantially all of the weight of the payload.

Rails and Payload-Receiving Fixtures

Figure 8A:
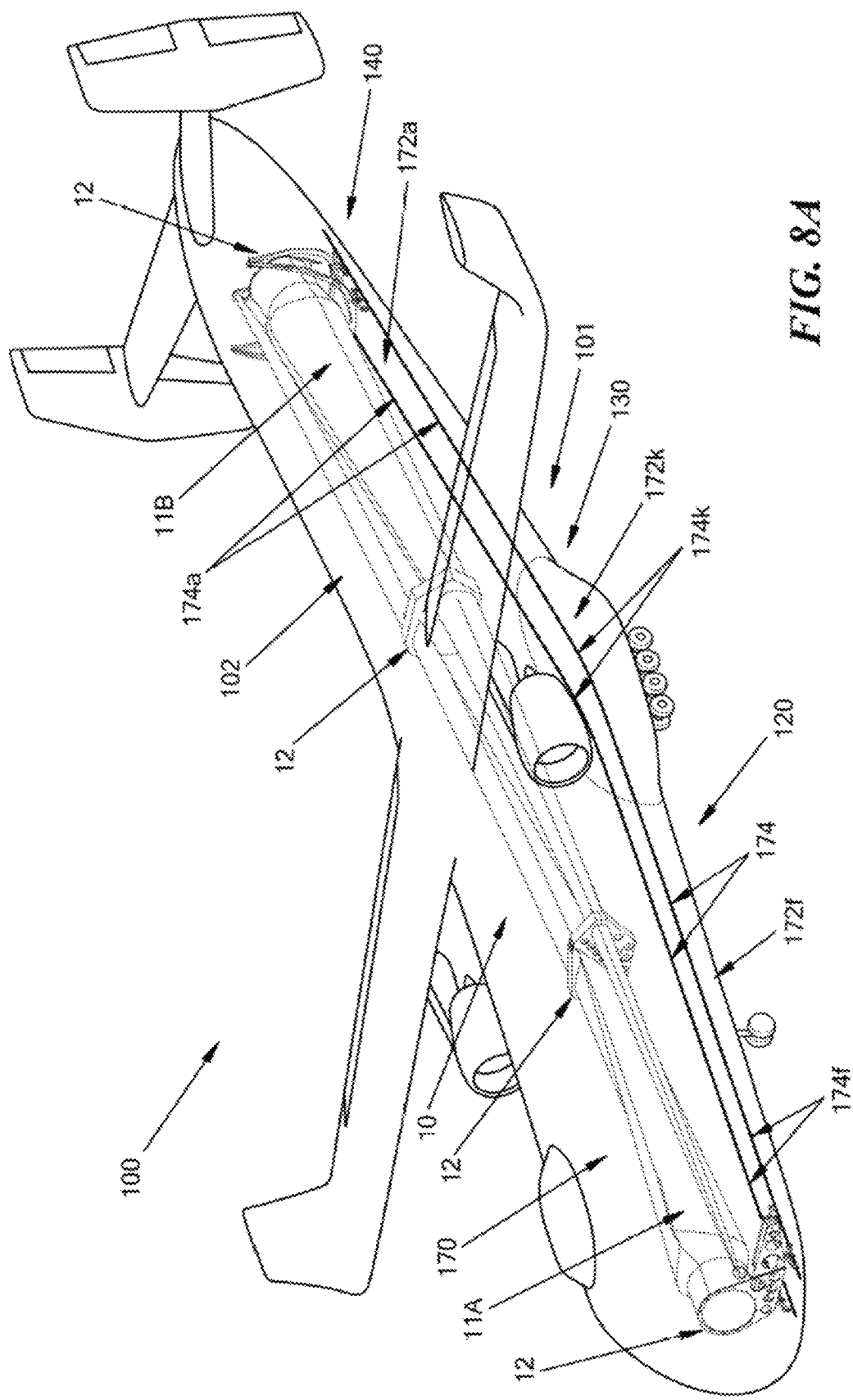
FIG. 8A is an isometric, transparent view of the aircraft of FIG. 1B having the payload disposed therein.
Figure 8B:
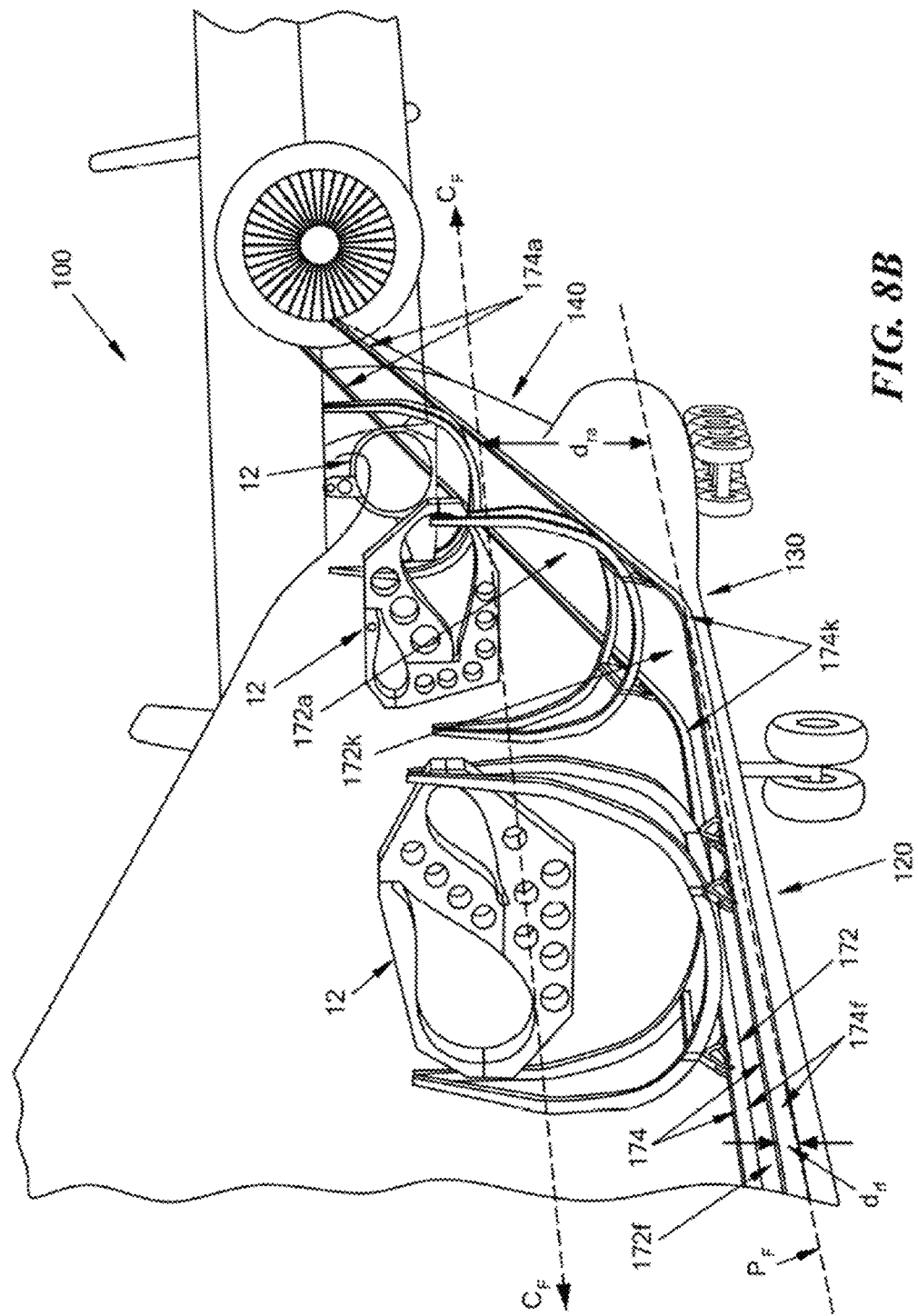
FIG. 8B is a detailed, front-side isometric, transparent view of the aircraft of FIG. 8A with wind turbine blades of the payload hidden from view to better illustrate a pair of rails disposed in the interior cargo bay and exemplary payload-receiving fixtures for holding the wind turbine blades coupled to the rails.
Figure 8C:
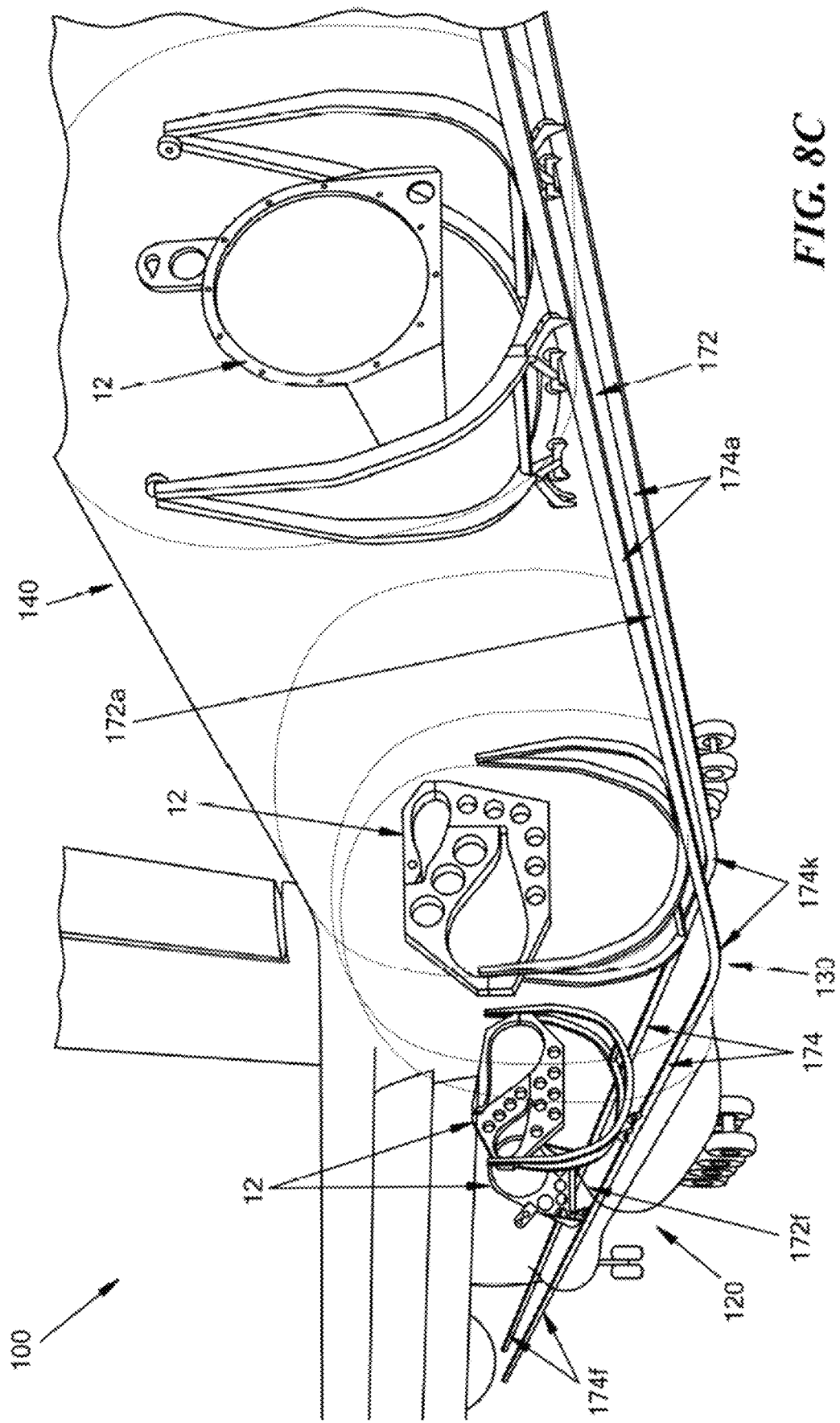
FIG. 8C is a detailed, back-side isometric, transparent view of the aircraft of FIG. 8B.

Hidden from view in the previous figures of the aircraft 100, but illustrated in FIGS. 8A-8C are a pair of rails 174 coupled to, extending from, or otherwise associated with the floor 172 of the cargo bay 170. Some of the illustrations may look incomplete or incompatible with other figures, such as having rails extending beyond what looks like the terminal end of a fixed portion of the fuselage (see, e.g., FIG. 8C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Much like the bay 170 and the floor 172, the rails 174 can extend in a continuous manner from the forward end 120, through the kinked portion 130, and into the aft end 140. The rails 174 can thus be configured to have a forward end 174$f$, a kinked portion 174$k$, and an aft end 174$a$. As a result of the kinked portion 174$k$, a vertical distance dr, between the aft end 174$a$ and a plane $P_F$ defined by an interior bottom contact surface of the interior cargo bay 170 in the forward end 120 of the aircraft 100, i.e., the plane $P_F$ extending longitudinally and laterally through the forward end 172$f$ of the floor 172 and that is substantially parallel to the forward centerline $C_F$, is greater than a vertical distance $d_{rf}$ between at least a portion of the forward end 174$f$ and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the fuselage tail cone 142, a portion of at least one of the rails 174, as shown both rails 174, disposed in the aft bay portion 172$a$ can also be located above the plane extending substantially through an entirety of the top surface 102 of the forward end 120 of the fuselage 101. The angle at which the rails 174 are disposed in the aft bay portion 170$a$ can be akin to the kink angle $\alpha_K$. More generally, the rails 174 can extend in a manner such that a majority of it disposed in the aft bay portion 170$a$ is disposed at the kink angle $\alpha_K$. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated along the rails 174 from the forward end 174$f$ and towards the aft end 174$a$ until the payload reaches a desired location. That desired location can relate, for example, to placing a center of gravity of the payload within a desired range of a center of gravity of the aircraft. Translation of the payload can be aided by the fixtures 12 illustrated in FIGS. 8A-9. As shown best in FIG. 9, the fixtures 12 can have a variety of configurations that are configured to both receive a payload, such as wind turbine blades 11A, 11B (of fewer or more blades as desired) and translate along the rails 174 to place the payload at the desired location(s).

The payload-receiving fixtures 12, as shown fixtures 112, 212, 312, 412, can generally include a carriage 114, 114', a frame 116, and a receiver 118, 218, 318, 418. In at least some of the illustrated embodiments, a single type of carriage and a single type of frame are provided, while four different receivers are illustrated. A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, like the receivers 118, 218, 318, 418, and thus such usage of the term "payload-receiving fixture" herein, including in the claims, can be directed to just a receiver as provided for herein. Generally, that term in any claim should be read in that manner, unless such interpretation would be incompatible with the remaining portion of the claim, for example, if the claim separately recites a receiver.

Some of the illustrations may look incomplete or incompatible with other figures, such as looking like a receiver is not quite properly coupled to a frame (see, e.g., FIGS. 8B, 8C, and 9 as filed) or the fixture 12 not being in contact with the rails 174 (see, e.g., FIG. 9), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Figure 9:
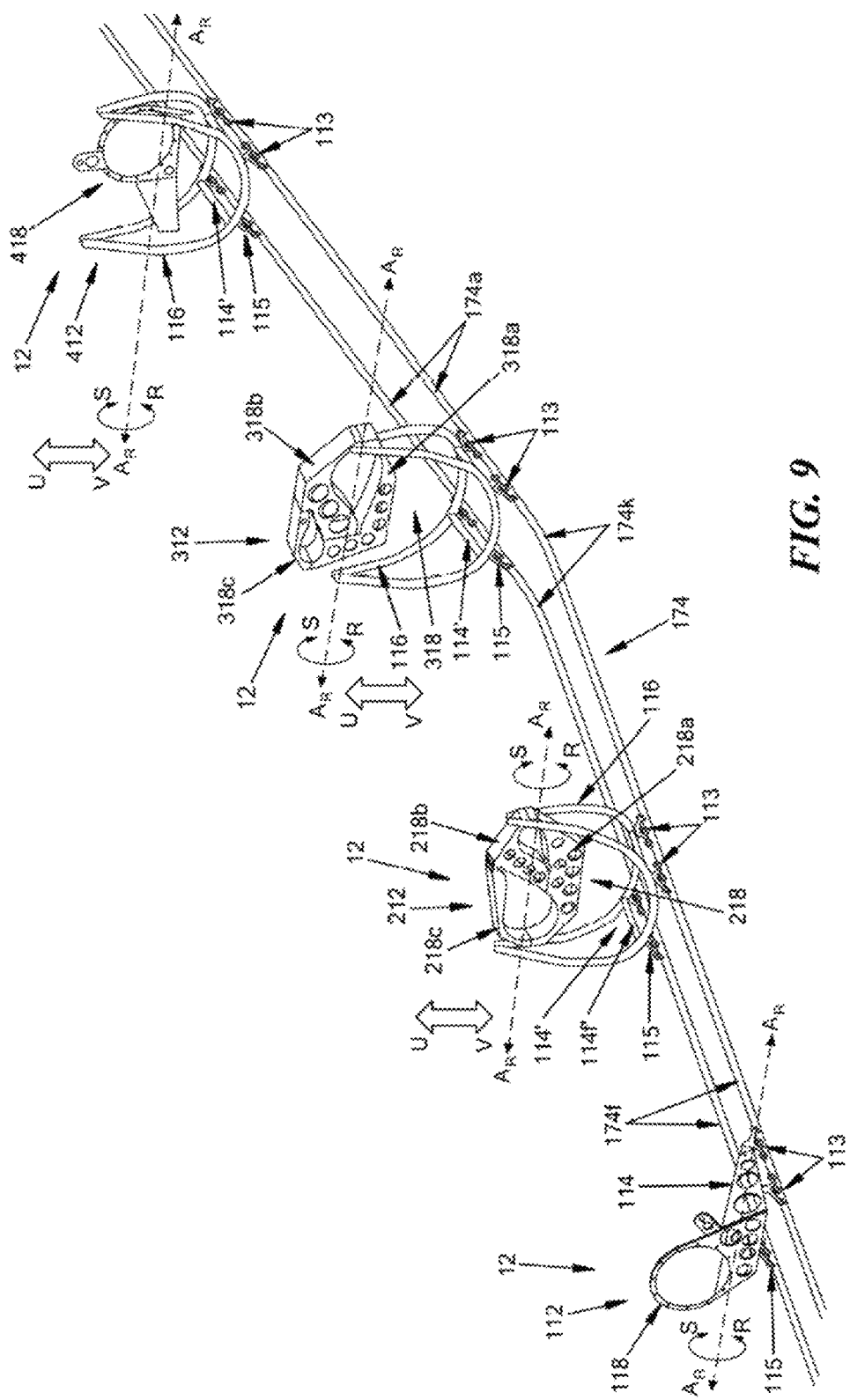
FIG. 9 is an isometric view of the rails and payload-receiving fixtures of FIG. 8B.

As shown in FIG. 9, a first payload-receiving fixture 112 includes a carriage 114 having a plurality of wheel sets 113 associated therewith. Each wheel set 113 is part of a whiffle tree 115 that extends from the carriage 114 to couple the wheels of the wheel sets 113 to the carriage 114. A receiver 118 is coupled to the carriage 114. The receiver 118 includes a plurality of holes or openings (these words may be used interchangeably herein) that can be used to receive a wind turbine blade. In the illustrated embodiment, the receiver 118 is designed to be a terminal end payload-receiving fixture with the largest opening configured to receive a base of a wind turbine blade and one or more of the other openings configured to receive a tip of a second blade. The other openings disposed in the receiver 118 can also make the fixture 112 lighter in weight, making it more suitable for flying, and/or can be used in conjunction with securing a location of the payload within the cargo bay. In alternative embodiments, a frame, like the frame 116, can be used to couple the fixture 112 to the carriage 114.

A second payload-receiving fixture 212 provided for in FIG. 9 includes a carriage 114', wheel sets 113, and whiffle trees 115, each of which are the same as discussed above with respect to the carriage 114, wheel sets 113, and whiffle trees 115, except for slight differences between the carriages 114', 114. More particularly, a frame 116 is incorporated into the carriage 114', supporting the receiver 218. Any known techniques for mounting or otherwise integrating the frame 116 to the carriage 114' can be employed, whether provided for herein or otherwise known to those skilled in the art. In the illustrated embodiment the frame 116 replaces two bars of the frame 114f′ of the carriage 114′. A person skilled in the art will recognize that other means for translation can be used in lieu of or in addition to wheels and wheel sets in any of these embodiments, including but not limited to skis, skids, linked tracks (e.g., tractor tracks, military tank tracks), articulated legs, air cushions in the manner of a hovercraft, or other structures that allow for translation between two structures. Generally, any of the fixtures provided for in the present disclosure can translate along the rail(s) 174, with rolling and sliding being interchangeably used and more generally being considered translation or advancement of the fixture. The receiver 218 is adapted for receiving wind turbine blades. More particularly, the receiver 218 is designed as an intermediate fixture to receive an intermediate portion(s) of a wind turbine blade(s). For example, the two largest openings can be configured to receive portions of two wind turbine blades, and additional openings or holes can serve a similar purpose as the openings of the receiver 118. The illustrated receiver 218 is configured in a manner that it has multiple pieces, as shown three 218a, 218b, and 218c, that can couple together, for instance by snap-fitting together, to secure a location of the blades with respect to the receiver 218 and/or other blades received by the receiver 218.

A third payload-receiving fixture 312 provided for in FIG. 9 is mainly akin to the second fixture 212, including the carriage 114′, wheel sets 113, whiffle trees 115, and frame 116, as well as a receiver 318 that is adapted for receiving wind turbine blades along intermediate portions of the blades. Like the second receiver 218, the two largest openings or holes of the third receiver 318 can be configured to receive intermediate portions of two wind turbine blades. The largest openings, and other openings, are positioned differently in the third receiver 318, but the intended purposes and uses of the same are akin. Further, like the second receiver 218, the third receiver 318 is designed to secure a location of the blades with respect to itself and/or other blades received by the receiver 318 by way of multiple pieces, as shown pieces 318a, 318b, and 318c, that couple together.

A fourth payload-receiving fixture 412 provided for in FIG. 9 is more akin to the first fixture 112 as it is also designed to be a terminal end receiving fixture. Its largest opening or hole can be configured to receive a base of a wind turbine blade and one or more of the other openings or holes can be configured to receive a tip of a second blade and/or serve other purposes as provided for above. The fourth fixture 412 utilizes the carriage 114′ and frame 116 of the fixtures 212 and 312. For each of the first and fourth receivers 118 and 418, a base of a wind turbine blade can be coupled to the respective structure 118, 418 by way of bolting it thereto using the bolt holes disposed around a circumference of the largest opening. A person skilled in the art will recognize other ways by which a blade(s) can be coupled to any of the receivers 118, 218, 318, or 418 provided for herein.

Further, while in the illustrated embodiments the receivers 118, 218, 318, or 418 are generally designed to hold two wind turbine blades, a person skilled in the art will recognize those receivers, or other receivers, can be configured to hold other numbers of wind turbine blades, including one, three, four, five, or even more. As designed, the fixtures 12 and blades 11A, 11B, 11C, 11D can be packaged in a repetitive, repeatable manner, thus allowing for the center of gravity of the payload to be consistent across packaged payloads. Such packaging can be done in a manner that provides a compact volume of the irregular payload. Still further, while the fixtures 112, 212, 312, 412 are illustrated for use in conjunction with wind turbine blades, a person skilled in the art will recognize such fixtures can be used, re-designed, adapted, etc. for use with other large structures, including but not limited to industrial oil equipment, mining equipment, rockets, military equipment and vehicles, commercial aerospace vehicles, crane segments, aircraft components, space launch rocket boosters, helicopters, generators, or hyperloop tubes. Additionally, the various fixtures 112, 212, 312, 412, as well as other configurations of fixtures and/or components of the fixtures (e.g., carriages like the carriage 114, 114′, frames like the frame 116, receivers like the receivers 118, 218, 318, 418, etc.) can be provided as a packaging kit to allow for the various fixtures and/or their components to be selected for particular uses, designs, and functions in a plug-and-play manner. The fixtures themselves can be pre-designated for particular structures (e.g., wind turbine blades) and/or particular locations with respect to such structures (e.g., a terminal end, an intermediate—possibly designated—position).

As the fixtures 12 travel along the rails 174, some or all of them can be adapted to rotate and/or translate to enable desirable handling during travel. By way of example, all four of the fixtures 12 can be configured to rotate in directions R and S about a pivot axis $A_R$ of each of the fixtures 12, while at least the fixtures 12 that pass through along the kinked portion 174p of the rail 174 can be configured to translate vertically, up-and-down with respect to the rail 174 as shown by in directions U and V. Such movements can be achieved using known techniques for causing rotational and translational actuation, including but not limited to hydraulics, pistons, hydraulic pistons, pulleys-and-cables, and air chambers, among others. Further, such movements can be selectively active or passive. For example, with respect to an active movement, one or more of the fixtures 12 and/or the payload (it is noted that the payload can be interpreted to include or not include the fixtures as appropriate) can be monitored, for instance by a location and/or pressure sensor, and in response to one or more designated parameters or other cues (e.g., visual, tactile), action can be taken to rotate or vertically translate the fixture(s) 12 as desired. The input to take the action can be manual, e.g., by a person, or automated, by a program that acts in response to the designated parameter(s). Alternatively, or additionally, with respect to passive movement, one or more of the fixtures 12 can be designed to automatically mechanically rotate or vertically translate as a result of a change in conditions, such as translating the fixture(s) 12 and payload along the rails 174. In this type of instance, certain movements, such as part of the payload rising up as it becomes disposed in the aft bay portion 170a, may cause one or more fixtures to rotate and/or vertically translate.

Additional details about tooling for cargo management, including rails and payload-receiving fixtures and fuselage configuration for enabling loading and unloading of payloads into aft regions of a continuous interior cargo bay are provided in International Patent Application No. PCT/US2020/049784, entitled "SYSTEMS AND METHODS FOR LOADING AND UNLOADING A CARGO AIRCRAFT," and filed Sep. 8, 2020, and the content of which is incorporated by reference herein in its entirety.

Kinked Fuselage—Structural Transition Zone

In contrast to previous solutions that utilize a complex single wedge frame to connect two constant-section semi-monocoque fuselage structures together, and thereby drive all the complexity into that single wedge frame to keep complexity out of the two adjoining fuselage structures, examples of the present disclosure enable complex fuselage changes (e.g., the forward-to-aft kink or bend angle in the fuselage and interior cargo bay centerline) to over multiple transverse frames and longitudinally continuous skin panels. The examples of the present disclosure thus reduce the overall structural complexity transition zone between more simply shaped forward and aft fuselage sections.

Examples of the present disclosure provide for an entire semi-monocoque kinked transition section that can be constructed from multiple transverse frames, multiple skin panel segments, and stringers, with compound curvature skins to bridge the gap between two fuselage sections with different frame angles. Examples of the presently described transition section can be "plugged" in between forward and aft fuselage sections and can therefore be connected to a forward fuselage portion via a standard transverse frame (e.g., a ring frame that circumscribes the fuselage), and can likewise be connected to an aft fuselage portion via a different, but similarly standard, transverse frame oriented at an angle to accommodate the overall bend in the fuselage that occurs across the transition zone (i.e., the kinked portion of the fuselage that extends longitudinally between the transverse frame at the aft end of the forward portion and the transverse frame at the forward end of the aft portion), where most or all of the transverse frame sections of the forward portion are aligned in parallel and, similarly, most or all of the transverse frame sections of the aft portion are also aligned in parallel to each other and also at an angle (e.g., the bend angle) with respect to the transverse frame sections of the forward portion. However, examples of the present disclosure include transition sections that can be a unitary structure with forward and aft fuselage sections, such that the end frames of the forward and aft fuselage sections are also beginning frames of the transition section, or, alternatively one or more of the forward and aft fuselage sections and the transition section can be constructed as entire sub-segments that are joined together during a final assembly of the entire fuselage. The change in fuselage angle between the forward and aft transverse frames within the transition zone can occur over longitudinally continuous skin panels to reduce complexity of the angle change joint. In other words, aspects of the present disclosure can reduce the complexity of each single fuselage joint and frame compared with solutions where the fuselage bend occurs across any one single frame. Accordingly, examples of the present disclosure can instead add more complexity to the skin panels by extending the fuselage bend across two or more transverse frame sections, with curved, bent, and/or tapered longitudinal panels and/or frame stringers extending therebetween.

FIG. 10A is a side view 2D illustration of the structure 500 of the cargo aircraft fuselage 100, showing two transverse frame sections that define a kinked transition region 530 between a forward fuselage region 520 and an aft fuselage region 540. FIG. 10B is a detailed view of the kinked transition region of FIG. 10A, showing the kinked transition region extending from a forward transverse frame 532, which is aligned approximately perpendicular to a centerline 590F of the forward region 520 of the fuselage structure 500, to an aft transverse frame 538, which is aligned approximately perpendicular to a centerline 590A of the aft region 540. Accordingly, between the forward transverse frame 532 and the aft transverse frame 538 the centerline of the fuselage structure 500 is curved as it transitions between from a relatively constant forward centerline (at the aft end of the forward region 520) direction to a relatively constantly aft centerline direction (at the forward end of the aft region 540). This can be visualized by the two vertically parallel planes A-A and B-B that are drawn in FIG. 10B, with the forward transverse frame being aligned with plane A-A and the aft transverse frame 538 being angled with respect to plane B-B as shown.

Additionally, as shown in FIG. 10C, the fuselage structure 500 at the parallel planes A-A and B-B are overlaid to show that, in some examples, not only is the major plane of the aft transverse frame 538 angled with respect to the major plane of the forward transverse frame 532, but the aft transverse frame 538 is shaped differently to accommodate a fuselage taper that extends through the kinked transition region 530. As a result, a transverse area of the fuselage structure 500 is reduced in the aft direction through the kinked transition region 530. Though not illustrated directly, but a similar difference can be seen when plane B-B is angled to be the major plane of the aft transverse frame 538.

Figure 11A:
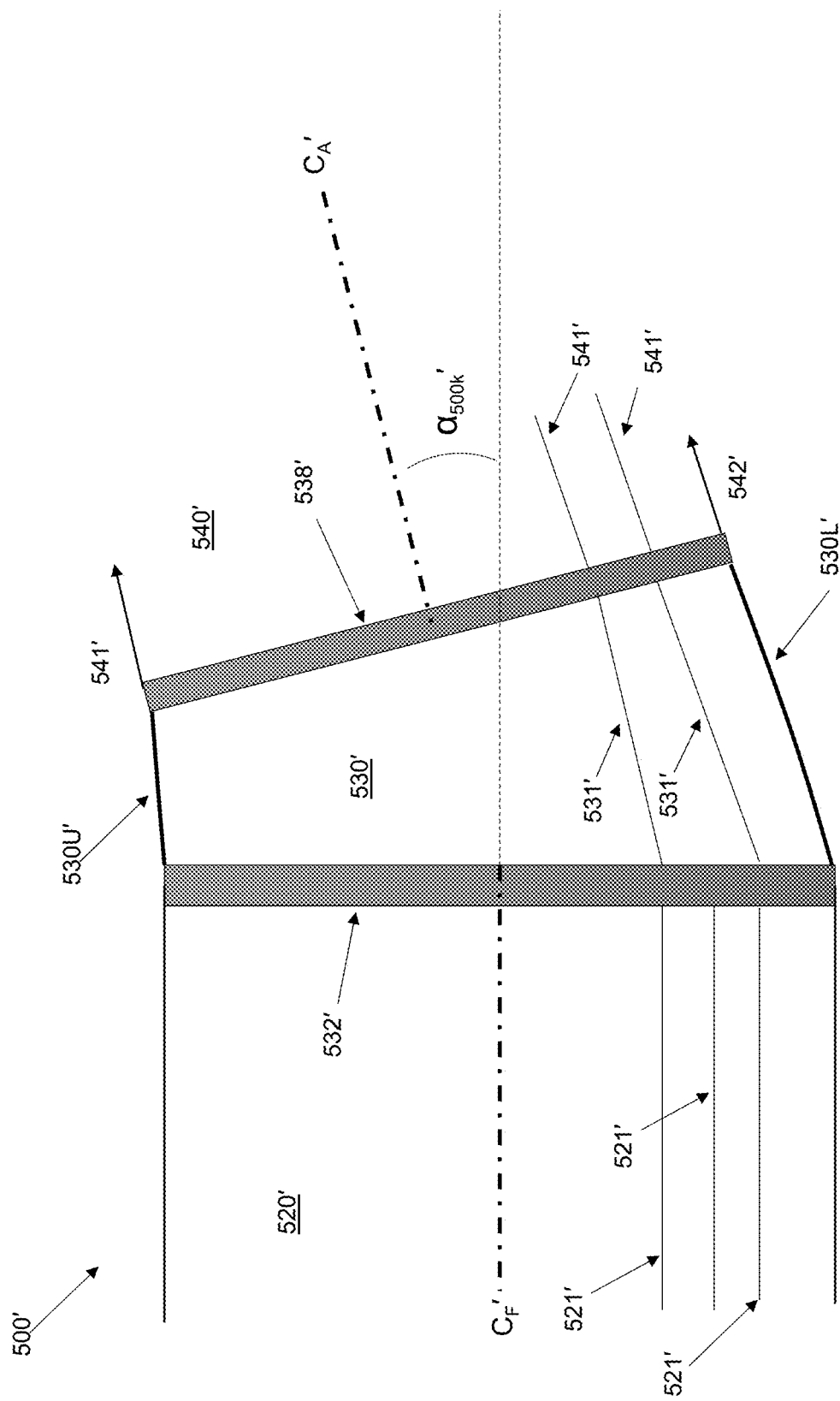
FIG. 11A is a close-up schematic side view of another exemplary embodiment of a kinked region of a cargo aircraft fuselage.

FIG. 11A is a 2D side view illustration of a smaller cargo aircraft fuselage structure 500' having a kinked transition region 530' according to aspects of the present disclosure. In this smaller cargo aircraft fuselage 500' a minimum of two transverse frames 532', 538' define the ends of the kinked transition region 530'. The kinked transition region 530' includes a plurality of transitional longitudinal stringers 531' that can, for example, be arranged as extensions of some or all of the forward longitudinal stringers 521' of a forward region 520'. As shown in FIG. 11A, the transitional longitudinal stringers 531' taper slightly to accommodate the bend and/or a taper of the fuselage structure 500' through the kinked transition region 530' and therefore are extensions of less than all of the forward longitudinal stringers 521'. Alternatively, the forward longitudinal stringers 521' may extend only partially through the kinked transition region 530'. The kinked transition region 530' in FIG. 11A defines an upper surface 530U' that extends across the upper exterior of the fuselage structure 530' from the forward transverse frame 532' to the aft transverse frame 538', as well as a lower surface 530L' that similarly extends across the lower exterior of the fuselage structure 500'. In some examples, the upper surface 530U' represents a minimum exterior surface distance between the forward and aft transverse frames 532', 538' and the lower surface 530L' approximately represents a maximum exterior surface distance between the forward and aft transverse frames 532', 538'.

The major plane of the forward transverse frame 532' is aligned perpendicular to a forward centerline $C_F'$ of the forward region 520' of the fuselage structure 500' and the major plane of the aft transverse frame 538 is aligned perpendicular to a centerline $C_A'$ of the aft region 540' of the fuselage structure 500'. Accordingly, the angle between the forward transverse frame 532' and the aft transverse frame 538' is approximately equal to the bend angle asook'between the forward and aft centerlines. In some examples, the exterior of the kinked transition region 530' smoothly transitions the exterior of the forward portion 520' with the exterior of the aft portion 540'. For example, the lower surface 530L' can tangentially intersect (e.g., with equal curvature) with the exterior of the forward region 520 at the forward end of the kinked transition region 530' (e.g., across the forward transverse frame 532') at a forward end and tangentially intersect with the exterior of the aft region 540' at the aft end of the kinked transition region 530' (e.g., across the aft transverse frame 538'). The same can be true for the upper surface 530U' and, in some examples, all exterior surfaces of the kinked transition region 530'. Accordingly, and as shown in FIG. 11A, the lower surface 530L'can define a vector 542' at the aft end of the kinked transition region 530' with an angle with respect to the aft centerline $C_A$ that is greater than an angle of the vector 541' defined by the upper surface 530U' at the aft end of the kinked transition region 530' (also with respect to the aft centerline $C_A$) due to an asymmetric taper through the kinked transition region 530', which can also extend along some or all of the aft region 540'.

Figure 11B:
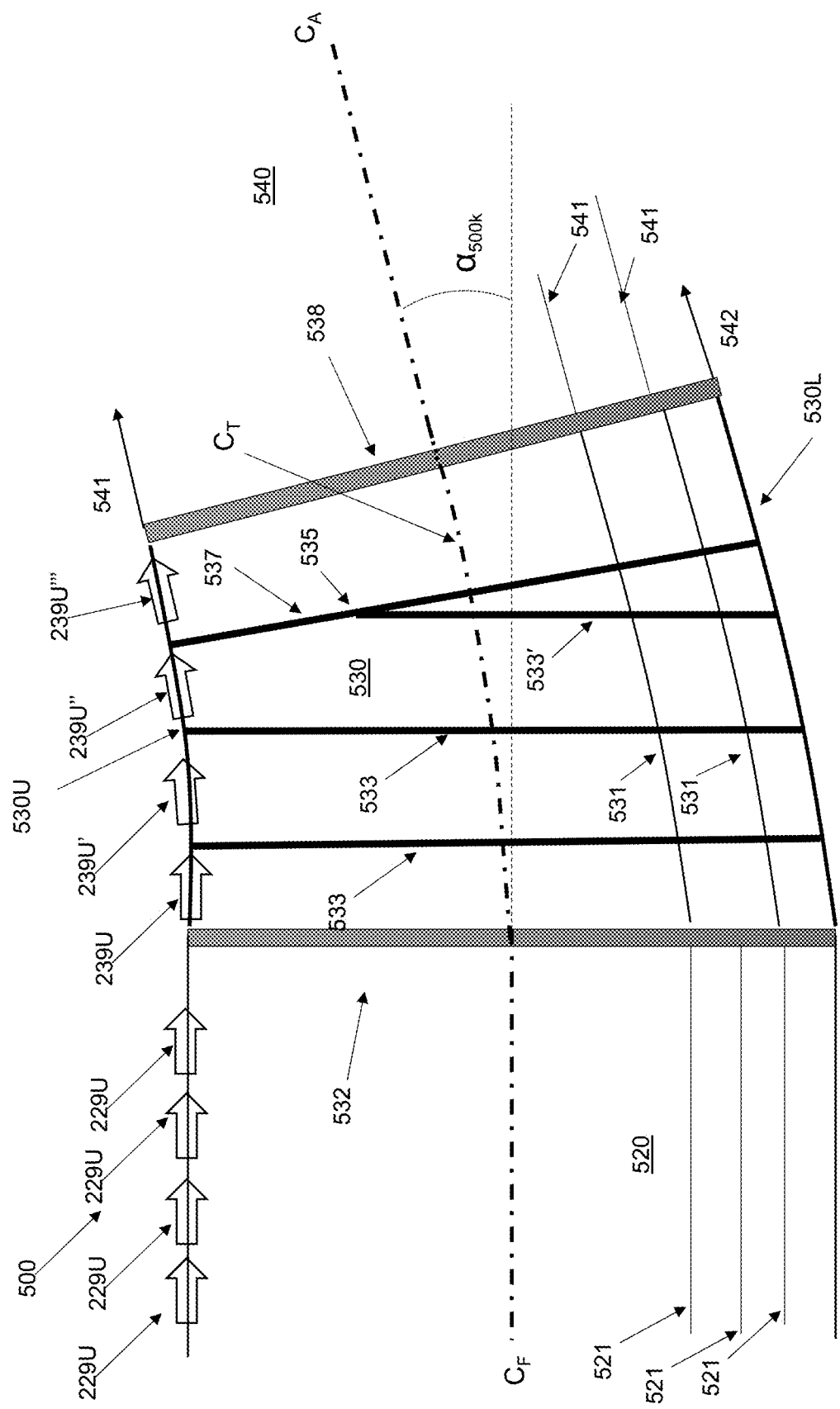
FIG. 11B is a close-up schematic side view of still another exemplary embodiment of a kinked region of a cargo aircraft fuselage.

FIG. 11B is a 2D side view illustration of the exterior of another kinked region of a larger cargo aircraft fuselage structure 500 of FIG. 10A whose kinked transition region 530 is defined by a plurality of transverse frame sections 532, 533, 533', 547, 538 to accommodate a longer length of the kinked transition region 530 as compared to the kinked transition region 530' of FIG. 11A. In FIG. 11B, the kinked transition region 530 includes, in order from front to back, a forward transverse frame 532, a plurality of intermediate forward transverse frames 533, a truncated transverse frame 533', an intermediate aft transverse frame 537, and ends with an aft transverse frame 538. The kinked transition region 530 includes a forward group of frames (e.g., the forward transverse frame 532, plurality of intermediate forward transverse frames 533, and the truncated transverse frame 533') aligned approximately in parallel with the frames of the forward region 520 and an aft group of frames (e.g., the intermediate aft transverse frame 537, and the aft transverse frame 538) aligned approximately in parallel with the frames of the aft region 540. In some instances, and as shown in FIG. 11B, one or more truncated frame sections 533' can extend to an intersection 535 where a frame section of the forward group intersects with a frame section of the aft group due to the spacing of the frames, which is likely to occur when an elongated kinked transition region 530 and a desired frame spacing dictates that at least one more frame section is present at the lower end of the kinked transition region 530 than at the top region.

Generally, the kinked transition region 530 can be a fuselage region that extends, tapers, and/or bends the fuselage structure 500 between two more structurally simple fuselage regions (e.g., the forward region 520 and the aft region 540). Advantageously, the kinked transition region 530 is also constructed from two or more structurally simple transverse frame sections.

The kinked transition region 530 defines a transitional centerline $C_T$ between the forward transverse frame 532 and the aft transverse frame 538, as well as a plurality of longitudinal stringers 531. The transitional centerline $C_T$ can be curved between the forward transverse frame 532 and the aft transverse frame 538, for example, with a complex curvature (e.g., curvature with multiple orthogonal components which are nonzero, for example, such that curvature which results from a surface that cannot be represented as an extrusion along any linear direction). In some examples, the longitudinal stringers 531 can be substantially parallel to each other across the exterior surface of the kinked transition region 530. In some examples, the kinked transition region 530 defines an exterior surface of complex curvature between the forward region 520 and the aft region 540. For example, surface vectors 229U along the exterior surface of the forward region 520 approaching the forward transverse frame 532 can be approximately constant with respect to the forward centerline (e.g., a cylinder) and surface vectors (not shown) along the exterior surface of the aft region 520 leaving the aft transverse frame 538 (e.g., vectors 541, 542) can be approximately constant with respect to the aft centerline (e.g., an asymmetric or tilted conical section as shown in FIG. 10A), but surface vectors (as indicated by arrows 239U, 239U', 239U'', 239U''' along the surface 530U) along the kinked transition region 530 are defined by complex curvature (e.g., along the upper and lower surfaces 530U, 530L, as illustrated).

Figure 12A:
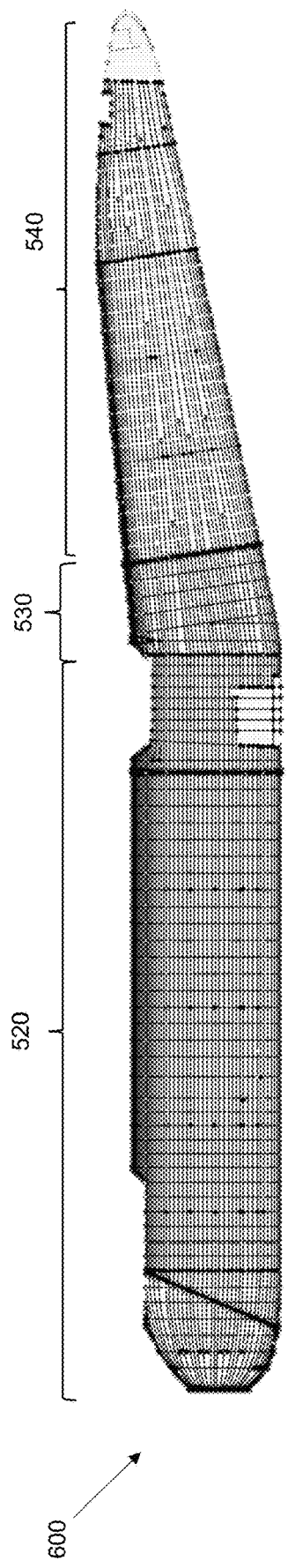
FIG. 12A is a side view of one exemplary embodiment of structural elements of a cargo aircraft fuselage.
Figure 12B:
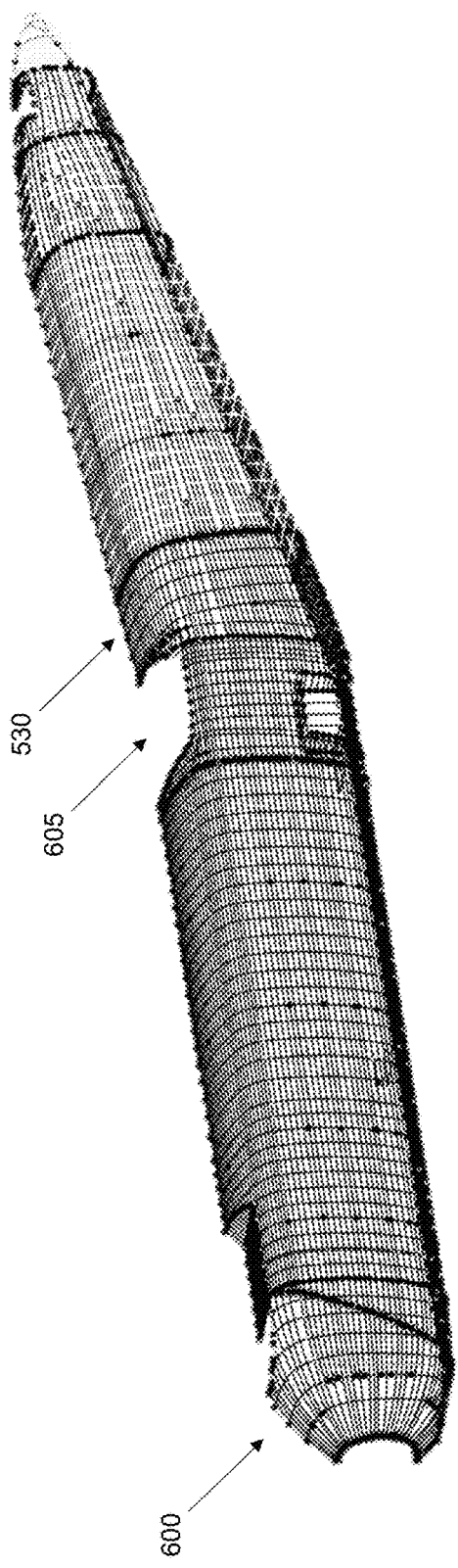
FIG. 12B is an isometric view of the fuselage of FIG. 12A.
Figure 12C:
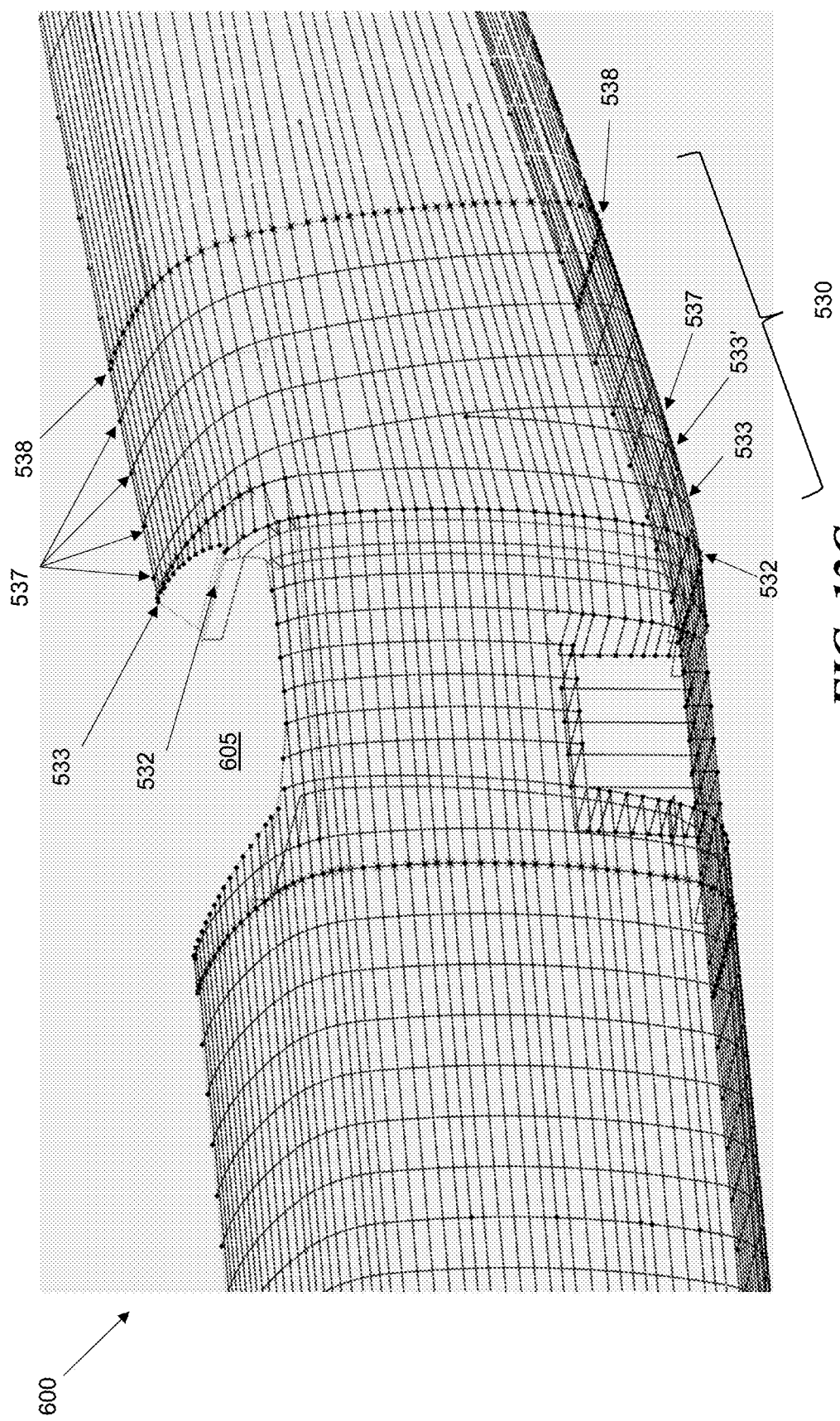
FIG. 12C is a close-up isometric view of a kinked portion of the fuselage of FIG. 12B.
Figure 12D:
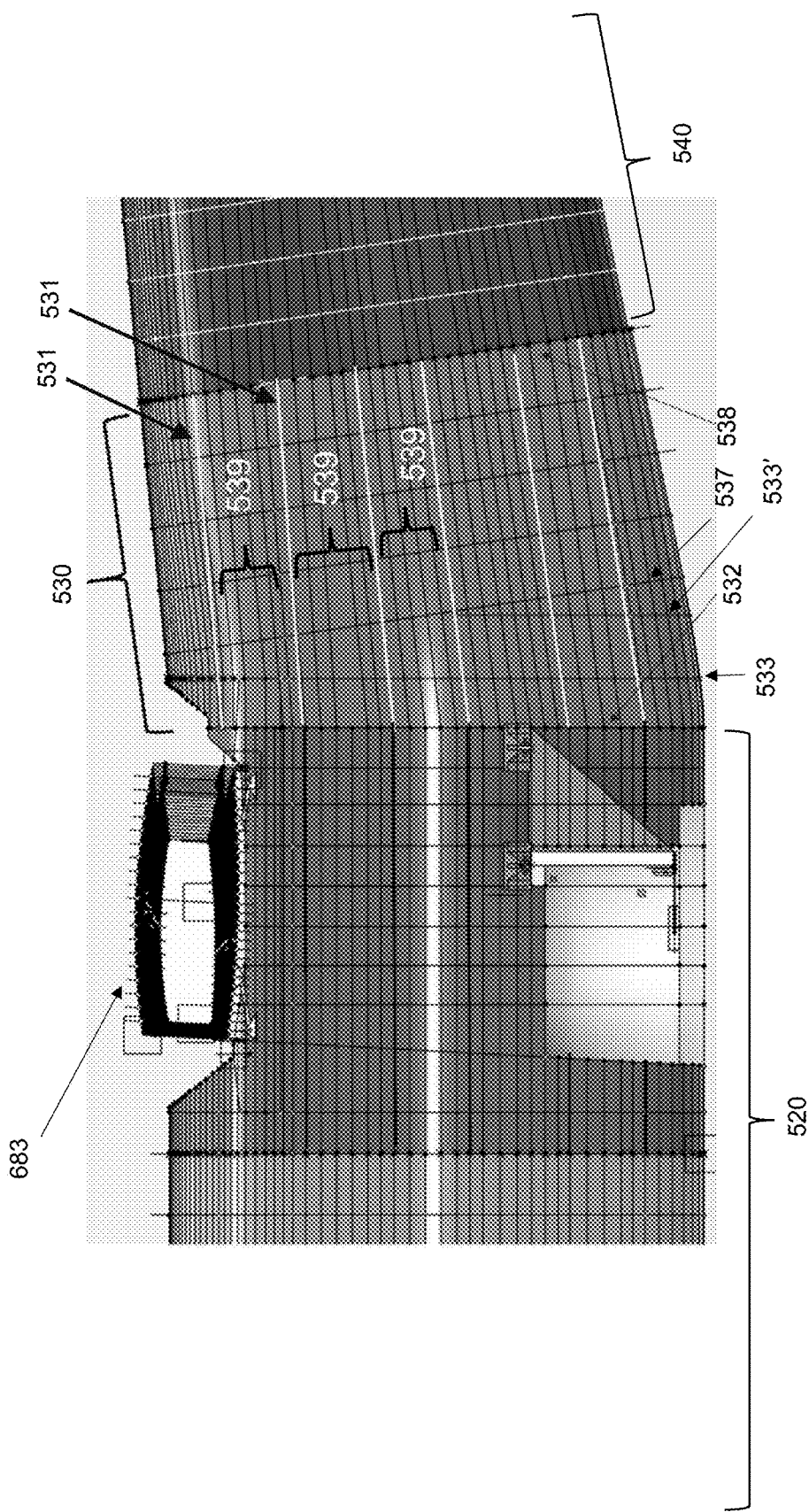
FIG. 12D is a side view of the kinked portion of the fuselage of FIG. 12C showing a fuselage skin.

FIGS. 12A and 12B are 3D illustrations of the structural elements 600 of a cargo aircraft fuselage, showing the forward region 520, kinked transition region 530, and aft region 540. FIG. 12C is an isometric detailed view of a lateral half of the kinked portion 530 of the structural elements 600 of the fuselage of FIGS. 12A and 12B. FIG. 12C shows the plurality of transverse frame elements 532, 533, 533', 547, 538 that make up the kinked portion 530. FIG. 12C also shows that an upper wing cut-out 605 is formed in the aft end of the forward region 520 to permit the wing box, as shown in FIG. 12D, to pass through the fuselage structure where it can be coupled to the structural elements 600 of a cargo aircraft fuselage. FIG. 12D is a side view of a partially-skinned exterior of the cargo aircraft fuselage of FIG. 12A showing the kinked transition region 530, the plurality of transverse frame elements 532, 533, 533', 547, 538, and the transitional longitudinal stringers 531. Specifically, FIG. 12D illustrates the kinked transition region 530 being a semi-monocoque structure comprised of at least six (6) skin panels attached together radially with at least two ring frames of different lengths (e.g., the forward transverse frame 532 and the aft transverse frame 538). FIG. 12D shows a wing box 683 being coupled with structural elements of the forward region 520 of the fuselage. FIG. 12D also shows that, in additional to the continuous longitudinal stringers 531 that extend from the forward transverse frame 532 to the aft transverse frame 538, a plurality of compound curvature skin panels 539 that can be continuous longitudinally from forward transverse frame 532 aft transverse frame 538. In some instances, the forward transverse frame 532 is also the aft-most frame of the forward region 520 and the aft transverse frame 538 is the forward-most frame of the aft region 540.

Figure 12F:
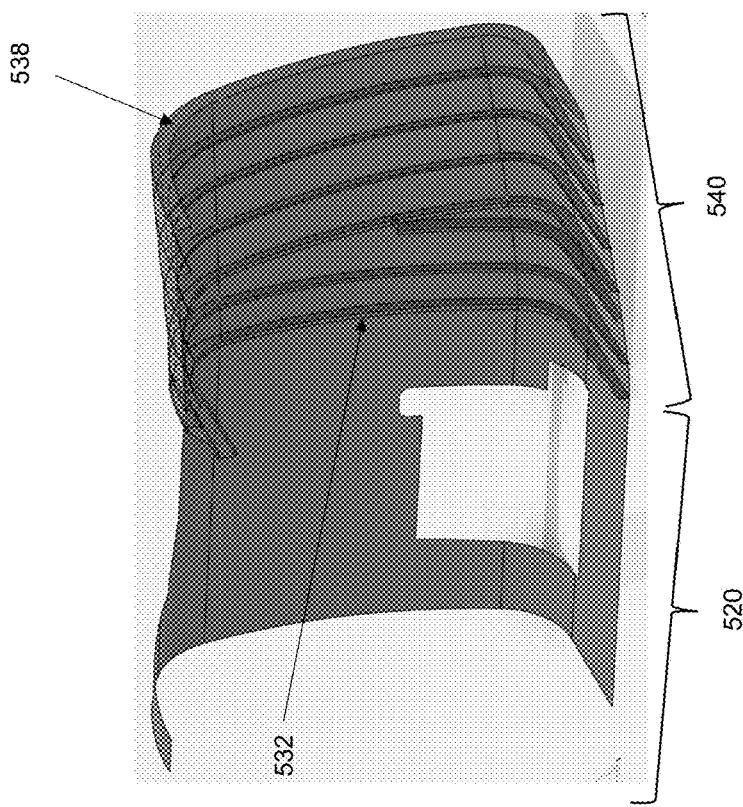
FIG. 12F is an isometric view of the kinked portion of the fuselage of FIG. 12E.
Figure 12E:
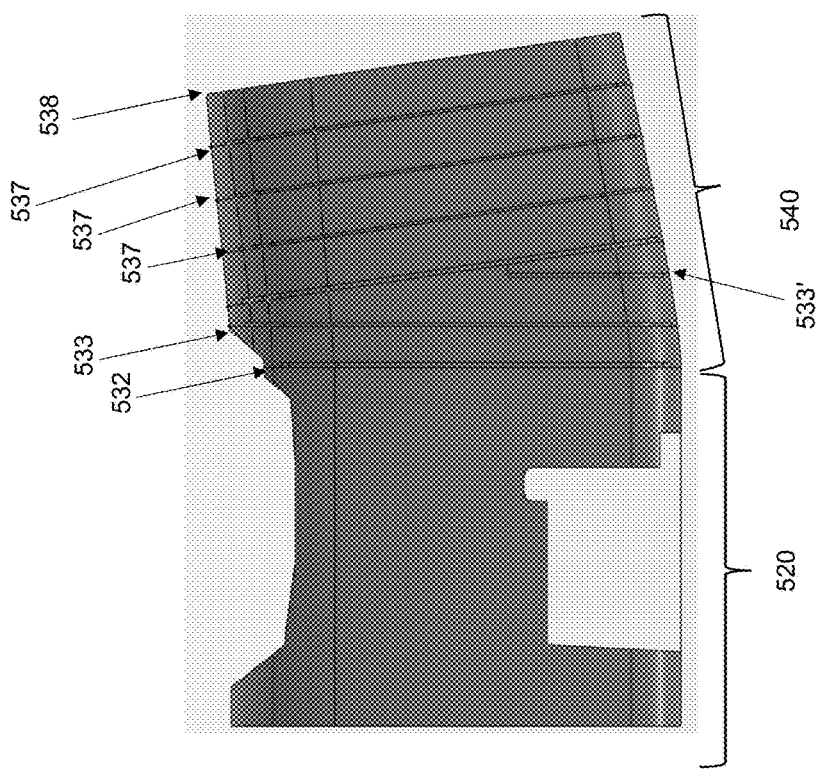
FIG. 12E is a side view of the kinked portion of the fuselage of FIG. 12C showing the transverse frame elements.
Figure 12G:
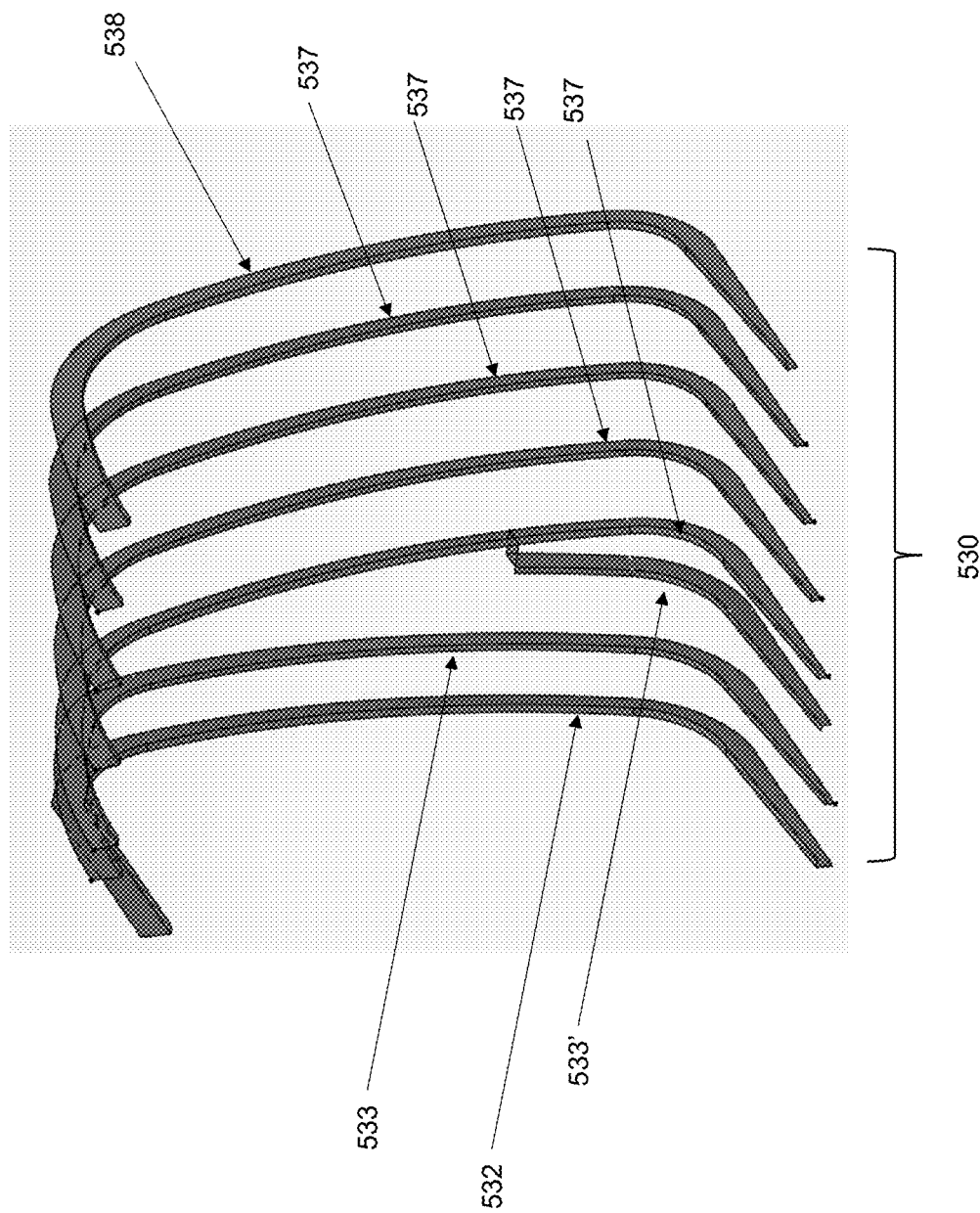
FIG. 12G is an isometric view of the transverse frame elements of FIG. 12F in isolation.

A side view of the kinked transition region 530 from a viewpoint inside the fuselage is illustrated in FIG. 12E and shows the transverse frame elements 532, 533, 533', 547, 538 in more detail. FIGS. 12F and 12G are isometric views of the kinked transition region 530, with FIG. 12G showing the transverse frame elements 532, 533, 533', 547, 538 without additional structural elements. The transverse frame elements 532, 533, 533', 547, 538 can have a depth that defines a minimum thickness of the fuselage (e.g., between the aircraft's skin and the inner volume of the cargo bay 170). One of ordinary skill in the art will appreciate that a number of different transverse frame exits any or all of which may be used to implement aspects of the present disclosure depending on the structural design goals, materials used, loads to be supported, and other aircraft design characterizes.

Kinked Fuselage —Aerodynamic Details

Another advantage of the elongated kinked transition regions described herein is that the fuselage "kink" can occur gradually over a long distance, and this allows for the aerodynamic impact of the kink to be reduced by (i) reducing the maximum degree of negative curvature (e.g., away from oncoming airflow) in the lower exterior of the transition region, and (ii) reducing the maximum degree of positive curvature (e.g., into oncoming airflow) in the upper exterior of the transition region. The negative curvature across the bottom of the kinked transition region can be improved via reduction in magnitude (e.g., made more gradual) by increasing the length of the transition region, to reduce boundary layer growth and delay flow separation at low aircraft attitudes in this important region where flow is introduced to the underside of the aft region 540 of the fuselage, where the tapering angle away from the airflow across the fuselage may be largest. The positive curvature across the upper exterior of the transition region can be improved via reduction in magnitude (e.g., made more gradual) by both increasing the length of the transition region and by locating the upper-most bend in the fuselage structure (e.g., the upper structural surface 530U, which represents the region of highest overall curvature by being the shortest length exterior region of the kinked transition region) close enough to the trailing end of an over-wing surface such that the two can be advantageously blended by covering them using a wing-to-body fairing to reduce the actual degree of positive exterior skin curvature presented to the airflow over the top of the exposed/wetted fuselage surfaces; this decreases local flow deceleration (which creates drag by applying positive pressure to forwards-facing surfaces) and weakens the counter-rotating vortices shed here by the fuselage (which also creates drag amongst other undesirable aerodynamic effects).

Figure 13A:
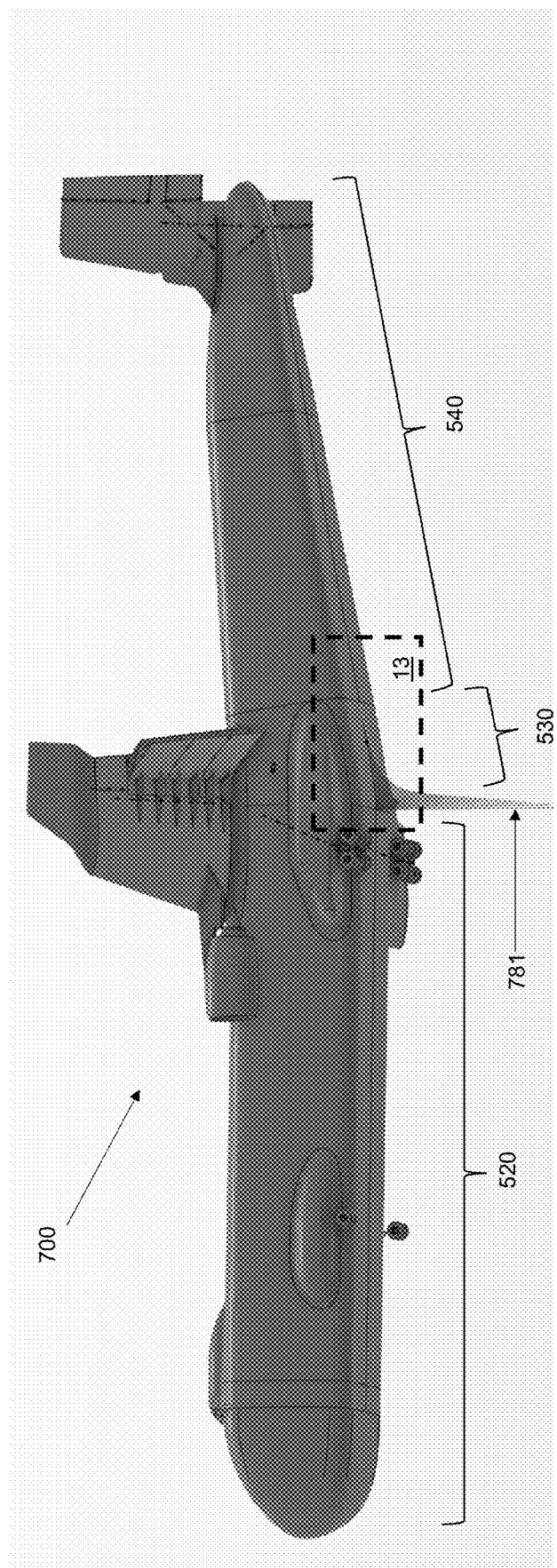
FIG. 13A is a side view of the skinned exterior of the cargo aircraft of FIG. 12A.
Figure 13B:
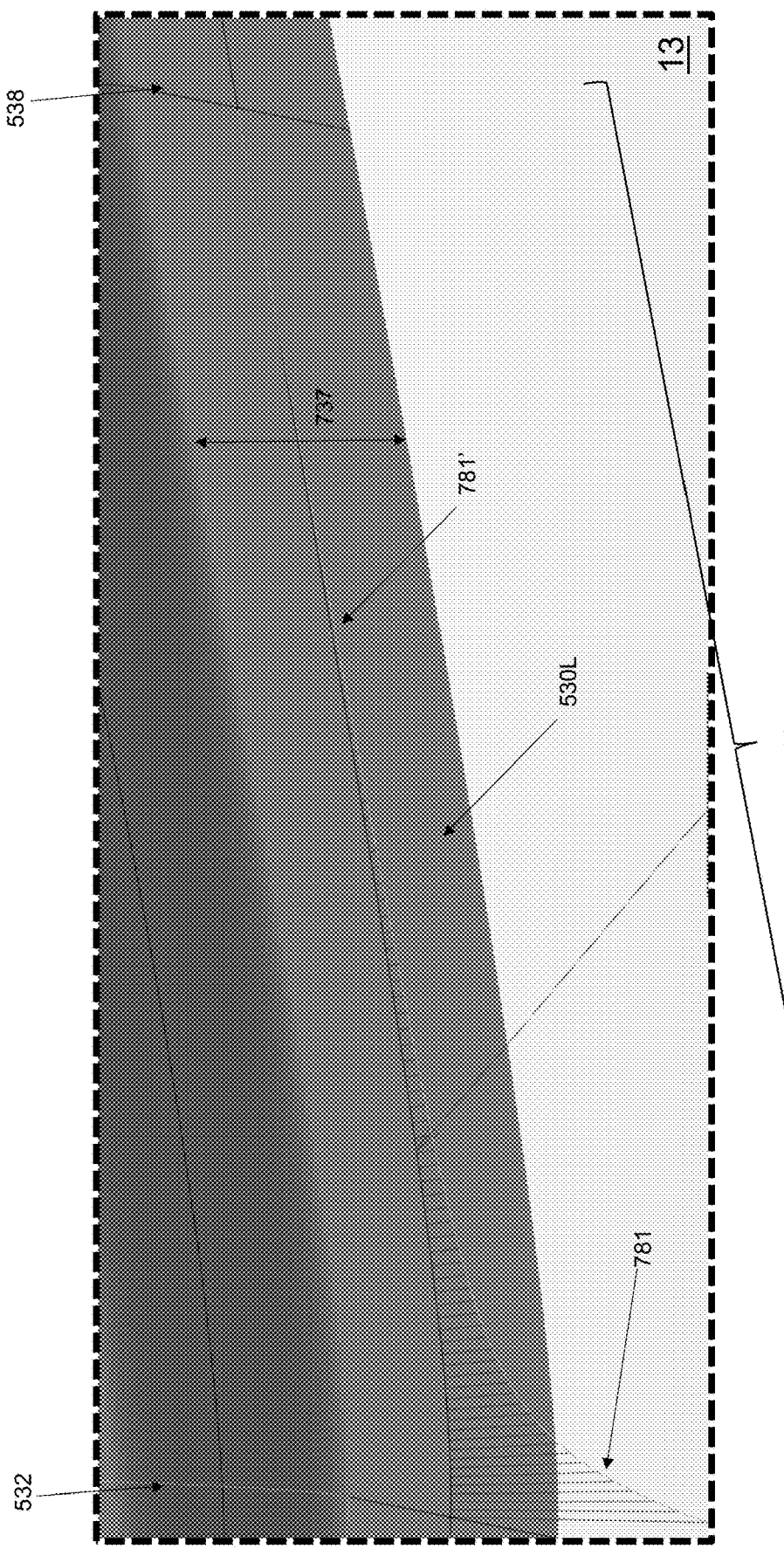
FIG. 13B is a detail side view of an underside of a kinked portion of a fuselage exterior of FIG. 13A.

FIG. 13A is a side view of the fully-skinned exterior 700 of the cargo aircraft of FIG. 12A. The curvature 781 on the lower surface of the kinked transition region 530 of the fuselage is plotted, with a detail 13 view of the underside of the kinked transition region 530 shown in FIG. 13B where the point 781' at which the curvature 781 drops below approximately 1% of peak value is indicated. Longer, more gradual transitions are typically more aerodynamically desirable and the elongated kinked transition regions described herein enable a more gradual transition to occur. Additionally, the lower exterior surface 530L of the kinked transition region 530 can be flat across a lateral width 737 of the kinked transition region 530, which is desirable from a manufacturing perspective because this part of the transition region is simply curved (in an area which is otherwise mostly composed of surfaces with complex curvature), and the structural skin panels in this region can be created from a sheets of flat aluminum stock by simply roll-forming the skin using a variable bend radius along the sheet's length. Furthermore, having flat panels reduces the complexity of attaching structural elements such as frames or stringers.

Figure 14A:
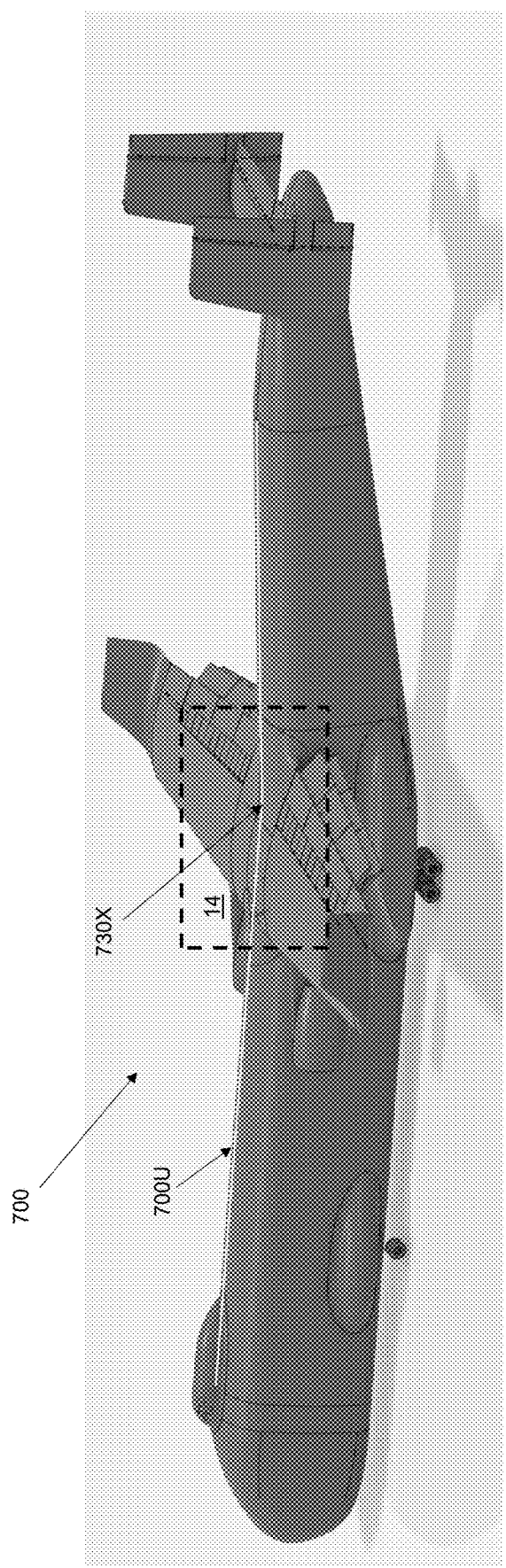
FIG. 14A is an isometric downward view of the skinned exterior of the cargo aircraft of FIG. 12A.
Figure 14B:
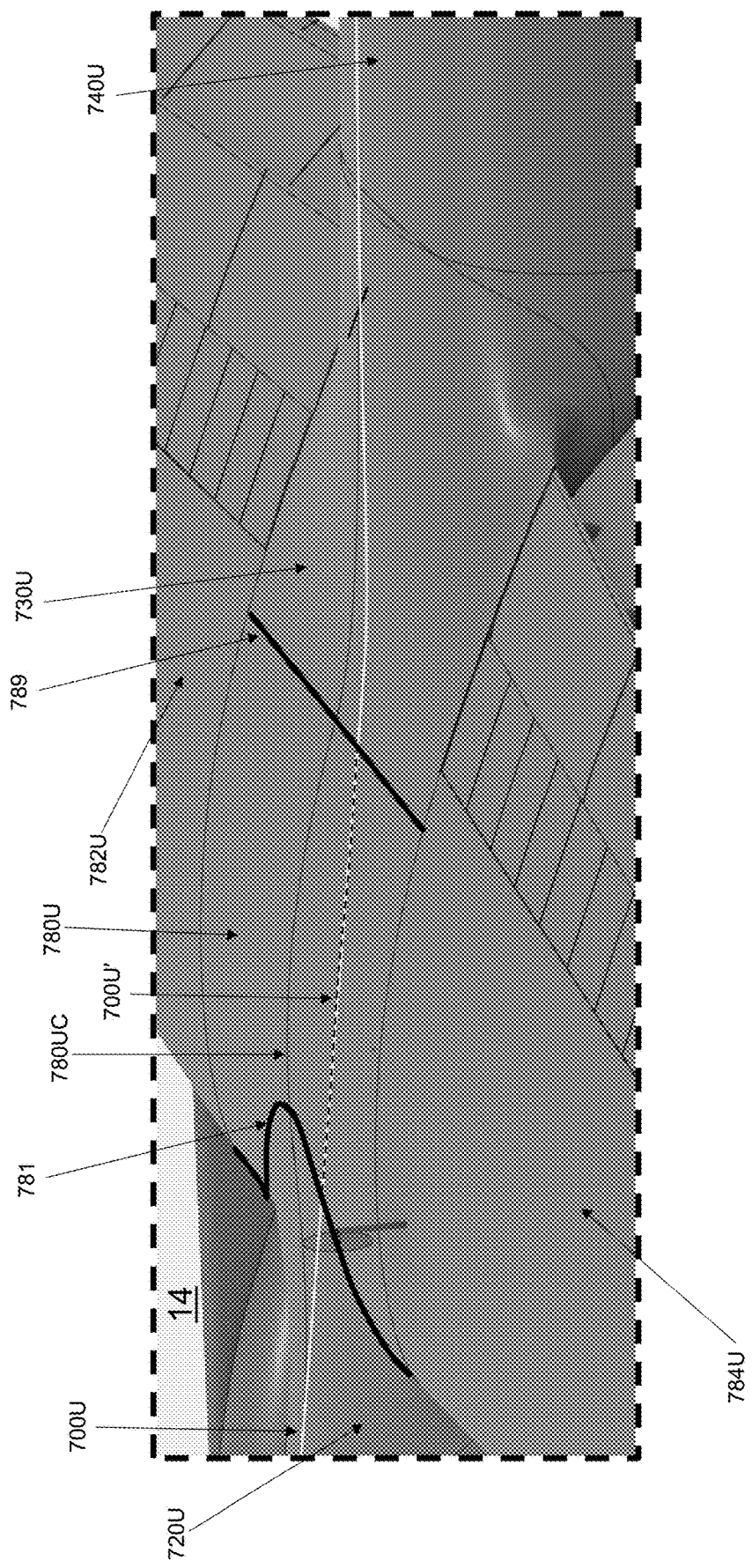
FIG. 14B is a detail isometric downward view of a central upper wing surface of the cargo aircraft of FIG. 14A.
Figure 14C:
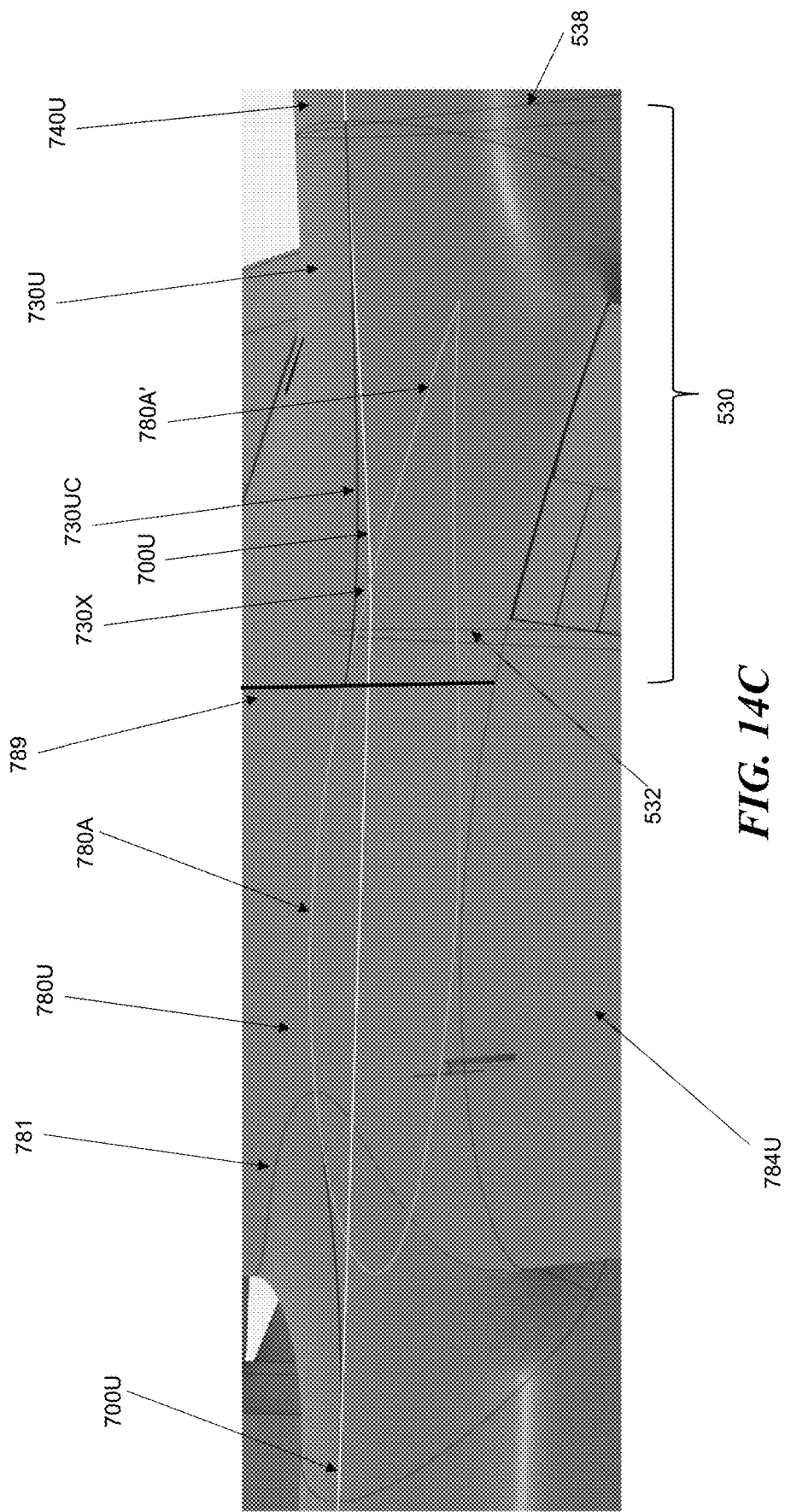
FIG. 14C is a detail view of the central upper wing surface of the cargo aircraft of FIG. 14B overlaid with an airfoil shape of the central upper wing surface.

FIGS. 14A-14C illustrate an advantageous feature of the present kinked fuselage to effectively hide the upper curvature in the kinked transition region 530 using a high-wing configuration (as opposed to a low-wing configuration, which is more common in large commercial passenger aircraft) to leverage positioning the wings and a wing-to-body fairing to cover the sharpest portion of the kink on the upper side with a already-existing feature which exhibits positive curvature. FIG. 14A shows the fully-skinned exterior 700 of the cargo aircraft of FIG. 12A with a centerline of the upper structural surface of the forward, transition, and aft regions drawn and indicated as line 700U, with the point of maximum positive curvature 730X indicated as well. The point of maximum positive curvature 730X represents the point in the upper structural surface where the bend in the centerline of the fuselage causes the sharpest bend in the upper structural surface (e.g., the location with the smallest radius of curvature). As shown, the resultant point of maximum positive curvature 730X occurs at a top of the structural surface of the kinked transition region 530. This is because the bend in the fuselage centerline is angled directly upwards (e.g., away from the ground).

FIG. 14B shows the view of detail 14 of FIG. 14A. In FIG. 14B, the upper surface of the wings 782U, 784U are visible, as well as a central upper wing surface 780U that spans across the fuselage between the upper surface of the wings 782U, 784U. Starting forwards and traveling aft along the aircraft centerline on the upper fuselage and wing surfaces, the forward wing-body fairing 720U transitions an exterior surface of the forward region 520 with the central upper wing surface 780U (with the aft boundary 781 of the forward wing-body fairing 720U being indicated) and an aft wing-body fairing 730U spans at least a portion of the upper-most surface of the kinked transition region 530. Further, the aft wing-body fairing 730U transitions the exterior surface of the aft region 540 and the kinked transition region 530 with the central upper wing surface 780U (with the forward boundary 789 of the aft wing-body fairing 730U being indicated). The aft wing-body fairing 730U, as shown in more detail in FIG. 14C, reduces the effect of the upper-most structural bend of the kinked transition region 530 on the airflow that passes across the central upper wing surface 780U by extending the upper exterior surface of the aircraft above the point of maximum positive curvature 730X to blend the trailing edge of the upper wing surface (i.e., boundary 789) with the aft exterior of the fuselage. In this manner, the elevation of the upper wing surface 780U above the non-wing fuselage structure (e.g., line 700U) advantageously allows a blending of the aft-edge of the upper wing surface 780U with the aft fuselage region 540 to occur above the point maximum positive curvature 730X with a significantly larger minimum radius of curvature (e.g., less maximum positive curvature). In FIG. 14B, the upper structural surface of the forward and kinked transition regions (i.e., line 700U') is drawn as it passes virtually across the upper wing cut-out 605, and centerline 780UC of the upper wing surface 780U is shown to indicate the distance of the central upper wing surface 780U above the non-wing structural elements 600.

FIG. 14C is a detail perspective view of the skinned central upper wing surface of the cargo aircraft of FIG. 12A overlaid with an airfoil shape 780A of the upper wing. In FIG. 14C, the advantage of the combination of the upper wing arrangement, the longitudinal position of the upper wing surface 780U, and the aft wing-body fairing 730U is illustrated more clearly. First, the airfoil shape 780A of the upper wing is illustrated completely, as if the entire airfoil curve of the wing was present at a location along the centerline of the fuselage, with the upper surface of the airfoil shape 780A representing the shape of the upper wing surface 780U along the centerline between surfaces of the forward wing-body fairing 720U and the aft wing-body fairing 730U. The point of maximum positive curvature 730X of the kinked transition region 530 is shown as being the approximate location of the hypothetical intersection of the airfoil shape 780A and the upper structural surface of the kinked transition region (e.g., line 700U). Accordingly, the aft wing-body fairing 730U can be placed above this intersection and presents a geometrically smooth transition between a point along the airfoil shape 780A (e.g., boundary 781) and the upper surface 740U of the aft region 540. The wing-body fairing 730U can, for example, tangentially intersect both (1) the airfoil shape 780A forward of the point of maximum positive curvature 730X (and, in some instances, forward of the forward transverse frame 532), and (2) the upper surface 740U of the aft region 540 well aft of the point of maximum positive curvature 730X. As a result, the surface of the wing-body fairing 730U can present a substantially reduced maximum positive curvature to the airflow across the upper wing surface 780U, and cover a positive-curvature feature on a forwards-facing aircraft surface (the upper fuselage kink) with another which is already necessary (the aft portion of the wing-body fairing). The aft wing-body fairing 730U can extend laterally as well to smoothly blend the aft regions of the upper wing surfaces 782U, 784U with the upper surface of the fuselage aft of the forward boundary 789 of the aft wing-body fairing 730U.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

Examples of the above-described embodiments can include the following:

1. A cargo aircraft, comprising:
    a fuselage defining a forward end, an aft end, and a continuous interior cargo bay that spans a majority of a length of the fuselage from the forward end to the aft end, the fuselage including:
        a forward portion containing a forward region of the continuous interior cargo bay, the forward portion defining a forward centerline along a longitudinal-lateral plane of the cargo aircraft,
        an aft portion containing an aft region of the continuous interior cargo bay, the aft portion defining an aft centerline extending above the longitudinal-lateral plane of the cargo aircraft, and
        a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline, and the kinked portion comprising a forward transverse frame section, an aft transverse frame section, and a plurality of longitudinal frame elements extending between the forward transverse frame section and the aft transverse frame section, the forward transverse frame section being coupled to an aft end of the forward portion and the aft transverse frame section being coupled to a forward end of the aft portion such that the forward transverse frame section is angled with respect to the aft transverse frame section about a lateral axis of the cargo aircraft;
    a first fixed wing extending from the fuselage in a first direction away from the fuselage; and
    a second fixed wing extending from the fuselage in a second direction away from the fuselage, the second direction approximately symmetric about a longitudinal-vertical counter plane of the cargo aircraft.

2. The cargo aircraft of claim 1,
    wherein the forward and aft transverse frame sections are ring sections.

3. The cargo aircraft of claim 1 or 2,
    wherein a major plane of the forward transverse frame section is approximately perpendicular to the forward centerline.

4. The cargo aircraft of any of claims 1 to 3,
    wherein the kinked portion comprises one or more additional transverse frame sections between the aft transverse frame section and the forward transverse frame section.

5. The cargo aircraft of claim 4,
    wherein at least one of the one or more additional transverse frame sections intersects one of the aft transverse frame section, the forward transverse frame section, or a different one of the one or more additional transverse frame sections.

6. The cargo aircraft of claim 5,
    wherein the intersecting at least one of the one or more additional transverse frame sections terminates at the intersection.

7. The cargo aircraft of any of claims 1 to 6,
    wherein a periphery of the forward transverse frame section is sized and shaped differently than a periphery of the aft transverse frame section.

8. The cargo aircraft of claim 7,
    wherein a cross-sectional area of the periphery of the aft transverse frame section is less than a cross-sectional area of the periphery of the forward transverse frame section.

9. The cargo aircraft of any of claims 1 to 8, further comprising:
    an upper wing box passing through the forward portion of the fuselage and connecting the first fixed wing to the second fixed wing,
    wherein the upper wing box is located forward of the forward transverse frame section.

10. The cargo aircraft of claim 9, comprising:
    an upper wing surface spanning across the first fixed wing, the upper wing box, and the second fixed wing, the upper wing surface having a central portion that spans the upper wing box and defines an airfoil shape that extends vertically above the forward transverse frame section, and the upper wing surface having first and second wing portions that span the first and second fixed wings, respectively, and extend vertically above and below the top of the forward transverse frame section,
    wherein the kinked portion of the fuselage defines an upper transition surface and the aft portion of the fuselage defines an aft upper surface, and
    wherein the upper transition surface of the kinked portion smoothly blends the central portion of the upper wing surface with the aft upper surface.

11. The cargo aircraft of any of claims 1 to 10,
    wherein an exterior surface of the kinked portion defines a geometrically smooth transition between an exterior surface of the forward portion and an exterior surface of the aft portion.

12. The cargo aircraft of claim 11,
    wherein the exterior surface of the kinked portion comprises a plurality of longitudinal panels extending from the forward portion to the aft portion, each of the plurality of longitudinal panels having complex curvature between an exterior of the forward end and an exterior of the aft portion.

13. The cargo aircraft of any of claims 1 to 12,
    wherein the cargo aircraft has a high-wing configuration with an upper wing surface extending across the top of the aircraft from the first fixed wing to the second fixed wing, and
    wherein a central portion of the upper wing surface includes at least a portion of an exterior surface of the kinked portion.

14. The cargo aircraft of claim 13,
    wherein a forward end of the upper transition surface of the kinked portion tangentially intersects the central portion of the upper wing surface and an aft end of the upper transition surface of the kinked portion tangentially intersects the aft upper surface.

15. The cargo aircraft of any of claims 1 to 14,
wherein the forward portion defines a forward lower exterior surface, the kinked portion defines a lower transition surface, and the aft portion defines an aft lower exterior surface, and
wherein the lower transition surface is geometrically smooth such that the lower transition surface smoothly blends the forward lower exterior surface with the aft lower exterior surface.

16. The cargo aircraft of claim 15,
wherein a forward end of the lower transition surface of the kinked portion tangentially intersects the forward lower exterior surface and an aft end of the lower transition surface of the kinked portion tangentially intersects the aft lower exterior surface.

17. The cargo aircraft of claim 16,
wherein the lower transition surface defines a curvature that decreases from the forward end to the aft end.

18. The cargo aircraft of any of claims 15 to 1715,
wherein a majority of the lower transition surface is substantially flat with respect to a lateral axis of the cargo aircraft.

19. The cargo aircraft of any of claims 1 to 18,
wherein an aft end of the aft region of the continuous interior cargo bay is configured to receive an aft end of an elongated contiguous payload from the forward end of the fuselage to dispose the elongated contiguous payload throughout substantially all of the length of the continuous interior cargo bay.

20. The cargo aircraft of claim 19,
wherein the continuous interior cargo bay includes a lower support system that extends from the forward end to the aft end of the aft region of the continuous interior cargo bay, and
wherein the lower support system is configured to allow translation of the elongated contiguous payload from the forward end to the aft end of the aft region along the lower support system.

21. The cargo aircraft of claim 19 or 20,
wherein the aft end of the aft region of the continuous interior bay extends above an upper outer surface of the forward portion of the fuselage.

22. The cargo aircraft of any of claims 1 to 21,
wherein the forward end of the fuselage comprises a cargo nose door configured to move to expose an opening into the continuous interior cargo bay through which an aft end of an elongate contiguous payload can be passed throughout substantially all of the length of the continuous interior cargo and to the aft end of the aft region of the continuous interior cargo bay.

23. The cargo aircraft of any of claims 1 to 22,
wherein the cargo aircraft defines a lateral pitch axis about which the cargo aircraft is configured to rotate a maximal degree during a takeoff operation while the aircraft is still on the ground without striking the fuselage on the ground.

24. The cargo aircraft of claim 23,
wherein the aft portion extends from the kinked portion at an angle approximately equal to the degree of maximal rotation of the aircraft during the takeoff operation.

25. The cargo aircraft of claim 23 or 24,
wherein the bend angle is approximately in the range of about 4 degrees to about 16 degrees with respect to the longitudinal-lateral plane of the cargo aircraft.

26. The cargo aircraft of any of claims 23 to 25,
wherein the aft region of the continuous interior cargo bay extends along a majority of a length of the aft portion of the fuselage.

27. The cargo aircraft of any of claims 23 to 26,
wherein the bend angle is approximately equal to the degree of maximal rotation of the aircraft during the takeoff operation.

28. The cargo aircraft of any of claims 23 to 27,
wherein the kinked portion is approximately vertically aligned with the lateral pitch axis.

29. The cargo aircraft of any of claims 1 to 28,
wherein the kinked portion defines a non-symmetrical upward transition along opposed top and bottom outer surfaces of the fuselage.

30. The cargo aircraft of claim 29,
wherein, at the aft end of the kinked portion, the top outer surface is angled less than the bottom outer surface with respect to the forward centerline.

31. The cargo aircraft of any of claims 1 to 30,
wherein the forward region of the continuous interior cargo bay defines a forward cargo centerline approximately parallel to the longitudinal-lateral plane of the cargo aircraft,
wherein the aft region of the continuous interior cargo bay defines an aft cargo centerline extending above the longitudinal-lateral plane of the cargo aircraft, and
wherein the aft cargo centerline extends along a majority of the aft centerline of the aft portion fuselage.

32. The cargo aircraft of claim 31,
wherein a length of the aft cargo centerline is at least approximately 25% of a length of a centerline of the continuous interior cargo bay.

33. The cargo aircraft of claim 31 or 32,
wherein at least a majority of the kinked cargo centerline is approximately aligned with the aft centerline.

34. The cargo aircraft of any of claims 31 to 33,
wherein at least a majority of at least one of the aft cargo centerline or the aft centerline is angled approximately in the range of about 6 degrees to about 12 degrees with respect to a ground plane when the cargo aircraft is fully resting on the ground.

35. The cargo aircraft of any of claims 31 to 34,
wherein at least a majority of the length of at least one of the aft cargo centerline or the aft centerline is angled approximately equal to or greater than a maximal takeoff angle of the cargo aircraft with respect to a ground plane when the cargo aircraft is fully resting on the ground.

36. The cargo aircraft of claim 35,
wherein approximately all of the length of at least one of the aft cargo centerline or the aft centerline is angled approximately equal to or greater than the maximal takeoff angle of the cargo aircraft with respect to a ground plane when the cargo aircraft is fully resting on the ground.

37. The cargo aircraft of any of claims 31 to 36,
wherein the continuous interior cargo bay defines a maximum payload length, and
wherein the aft cargo centerline defines a length at least approximately 30% of the maximum payload length.

38. The cargo aircraft of any of claims 1 to 37,
wherein a length of the aft portion of the fuselage is at least about 25% of the length of the fuselage.

39. The cargo aircraft of any of claims 1 to 38,
wherein the length of the fuselage is greater than 84 meters, and
wherein the continuous interior cargo bay defines a maximum payload length of at least about 70 meters.

40. The cargo aircraft of any of claims 1 to 39,
wherein the aft portion of the fuselage comprises a plurality of circumferentially disposed structural elements oriented orthogonally along the aft centerline.

41. A cargo aircraft, comprising:
a fuselage defining a forward end, an aft end, and a continuous interior cargo bay that spans a majority of a length of the fuselage from the forward end to the aft end, the fuselage including:
a forward portion containing a forward region of the continuous interior cargo bay, the forward portion defining a forward centerline along a longitudinal-lateral plane of the cargo aircraft,
an aft portion containing an aft region of the continuous interior cargo bay, the aft portion defining an aft centerline extending above the longitudinal-lateral plane of the cargo aircraft, and
a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;
a first fixed wing extending from the fuselage in a first direction away from the fuselage; and
a second fixed wing extending from the fuselage in a second direction away from the fuselage, the second direction approximately symmetric about a longitudinal-vertical center plane of the cargo aircraft,
wherein the cargo aircraft has an upper wing configuration with an upper wing surface extending across the top of the aircraft from the first fixed wing to the second fixed wing, and
wherein a central portion of the upper wing surface includes at least a portion of an exterior surface of the kinked portion.

42. The cargo aircraft of claim 41,
wherein the kinked portion comprises a forward end, an aft end, and a plurality of longitudinal frame elements extending between the forward end and the aft end, the forward end being adjacent to the forward portion and the aft end being adjacent to the aft portion such that the forward end is angled with respect to the aft end about a lateral axis of the cargo aircraft.

43. The cargo aircraft of claim 41 or 42, further comprising:
an upper wing box passing through the forward portion of the fuselage and connecting the first fixed wing to the second fixed wing,
wherein the upper wing box is located forward of the kinked portion.

44. The cargo aircraft of any of claims 41 to 43,
wherein a periphery of the forward end of the kinked portion is sized and shaped differently than a periphery of the aft end of the kinked portion.

45. The cargo aircraft of claim 44,
wherein a cross-sectional area of the periphery of the aft end of the kinked portion is less than a cross-sectional area of the periphery of the forward end of the kinked portion.

46. The cargo aircraft of any of claims 41 to 45, further comprising:
an upper wing box passing through the forward portion of the fuselage and connecting the first fixed wing to the second fixed wing,
wherein the upper wing box is located forward of the forward end of the kinked portion.

47. The cargo aircraft of any of claims 41 to 46,
wherein an exterior surface of the kinked portion defines a geometrical smooth transition between an exterior surface of the forward portion and an exterior surface of the aft portion.

48. The cargo aircraft of claim 47,
wherein the exterior surface of the kinked portion comprises a plurality of longitudinal panels extending from the forward portion to the aft portion, each of the plurality of longitudinal panels having complex curvature between an exterior of the forward end and an exterior of the aft portion.

49. The cargo aircraft of claims 46 to 48, comprising:
the upper wing surface spanning across the first fixed wing, the upper wing box, and the second fixed wing, the upper wing surface having a central portion of that spans the upper wing box and defines an airfoil shape that extends vertically above the forward end of the kinked portion, and the upper wing surface having first and second wing portions that span the first and second fixed wings, respectively, and extend vertically above and below the top of the forward end of the kinked portion,
wherein the kinked portion of the fuselage defines an upper transition surface and the aft portion of the fuselage defines an aft upper surface, and
wherein the upper transition surface of the kinked portion smoothly blends the central portion of the upper wing surface with the aft upper surface.

50. The cargo aircraft of claim 49,
wherein a forward end of the upper transition surface of the kinked portion tangentially intersects the central portion of the upper wing surface and an aft end of the upper transition surface of the kinked portion tangentially intersects the aft upper surface.

51. The cargo aircraft of any of claims 41 to 50,
wherein the forward portion defines a forward lower exterior surface, the kinked portion defines a lower transition surface, and the aft portion defines an aft lower exterior surface, and
wherein the lower transition surface is geometrically smooth such that the lower transition surface smoothly blends the forward lower exterior surface with the aft lower exterior surface.

52. The cargo aircraft of claim 51,
wherein a forward end of the lower transition surface of the kinked portion tangentially intersects the forward lower exterior surface and an aft end of the lower transition surface of the kinked portion tangentially intersects the aft lower exterior surface.

53. The cargo aircraft of claim 52,
wherein the lower transition surface defines a curvature that decreases from the forward end to the aft end.

54. The cargo aircraft of any of claims 51 to 53,
wherein a majority of the lower transition surface is substantially flat with respect to a lateral axis of the cargo aircraft.

What is claimed is:
1. A cargo aircraft, comprising:
a fuselage defining a forward end, an aft end, and a continuous interior cargo bay that spans a majority of a length of the fuselage from the forward end to the aft end, the fuselage including:
a forward portion containing a forward region of the continuous interior cargo bay, the forward portion defining a forward centerline along a longitudinal-lateral plane of the cargo aircraft,
an aft portion containing an aft region of the continuous interior cargo bay, the aft portion defining an aft centerline extending above the longitudinal-lateral plane of the cargo aircraft, and
a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline, and the kinked portion comprising a forward transverse frame section, and an aft transverse frame section such that the forward transverse frame section is angled with respect to the aft transverse frame section about a lateral axis of the cargo aircraft;

a first fixed upper wing extending from the fuselage in a first direction away from the fuselage;

a second fixed upper wing extending from the fuselage in a second direction away from the fuselage, the second direction approximately symmetric about a longitudinal-vertical center plane of the cargo aircraft;

an upper wing surface extending across a top of the cargo aircraft from the first fixed wing to the second fixed wing, a central portion of the upper wing surface defining an upper airfoil surface forward of the forward transverse frame section that extends vertically above the forward transverse frame section; and a wing-body fairing disposed above at least a portion of a structural surface of the kinked portion of the fuselage that extends from the forward transverse frame section to the aft transverse frame section, the wing-body fairing defining an upper transition surface that tangentially intersects an trailing edge of the upper airfoil surface forward of a point of maximum positive curvature of a structural surface and tangentially intersects an exterior surface of the fuselage aft of the point of maximum positive curvature, the wing-body fairing defining a maximum positive curvature less than the maximum positive curvature of the structural surface.

2. The cargo aircraft of claim 1, wherein the kinked portion comprises one or more additional transverse frame sections between the aft transverse frame section and the forward transverse frame section.

3. The cargo aircraft of claim 2, wherein at least one of the one or more additional transverse frame sections intersects one of the aft transverse frame section, the forward transverse frame section, or a different one of the one or more additional transverse frame sections.

4. The cargo aircraft of claim 3, wherein the intersecting at least one of the one or more additional transverse frame sections terminates at the intersection.

5. The cargo aircraft of claim 1, wherein a periphery of the forward transverse frame section is sized and shaped differently than a periphery of the aft transverse frame section.

6. The cargo aircraft of claim 5, wherein a cross-sectional area of the periphery of the aft transverse frame section is less than a cross-sectional area of the periphery of the forward transverse frame section.

7. The cargo aircraft of claim 1, further comprising:

an upper wing box passing through the forward portion of the fuselage and connecting the first fixed wing to the second fixed wing, wherein the upper wing box is located forward of the forward transverse frame section.

8. The cargo aircraft of claim 1, comprising:

wherein the upper transition surface of the wing-body fairing smoothly blends the central portion of the upper wing surface with an upper surface of the aft portion of the fuselage.

9. The cargo aircraft of claim 1, wherein an exterior surface of the kinked portion defines a geometrically smooth transition between an exterior surface of the forward portion and an exterior surface of the aft portion.

10. The cargo aircraft of claim 9, wherein the exterior surface of the kinked portion comprises a plurality of longitudinal panels extending from the forward portion to the aft portion, each of the plurality of longitudinal panels having complex curvature between an exterior of the forward end and an exterior of the aft portion.

11. The cargo aircraft of claim 1, wherein the forward portion defines a forward lower exterior surface, the kinked portion defines a lower transition surface, and the aft portion defines an aft lower exterior surface, and wherein the lower transition surface is geometrically smooth such that the lower transition surface smoothly blends the forward lower exterior surface with the aft lower exterior surface.

12. The cargo aircraft of claim 11, wherein a forward end of the lower transition surface of the kinked portion tangentially intersects the forward lower exterior surface and an aft end of the lower transition surface of the kinked portion tangentially intersects the aft lower exterior surface.

13. The cargo aircraft of claim 12, wherein the lower transition surface defines a curvature that decreases from the forward end to the aft end.

14. The cargo aircraft of claim 1, wherein the forward region of the continuous interior cargo bay defines a forward cargo centerline approximately parallel to the longitudinal-lateral plane of the cargo aircraft, wherein the aft region of the continuous interior cargo bay defines an aft cargo centerline extending above the longitudinal-lateral plane of the cargo aircraft, and wherein the aft cargo centerline extends along a majority of the aft centerline of the aft portion fuselage.

15. The cargo aircraft of claim 1, wherein the aft portion of the fuselage comprises a plurality of circumferentially disposed structural elements oriented orthogonally along the aft centerline.

16. The cargo aircraft of claim 1, wherein the upper transition surface defines a geometrically smooth transition between the upper airfoil surface and an upper exterior surface of the aft portion of the fuselage or an aft end of an upper exterior surface of the kinked portion of the fuselage.

17. The cargo aircraft of claim 1, wherein the upper transition surface extends laterally to smoothly blend aft regions of the upper wing surfaces with the upper surface of the fuselage aft of the forward end of the aft wing-body fairing.

18. A cargo aircraft, comprising:

a fuselage defining a forward end, an aft end, and a continuous interior cargo bay that spans a majority of a length of the fuselage from the forward end to the aft end, the fuselage including:

a forward portion containing a forward region of the continuous interior cargo bay, the forward portion defining a forward centerline along a longitudinal-lateral plane of the cargo aircraft, an aft portion containing an aft region of the continuous interior cargo bay, the aft portion defining an aft centerline extending above the longitudinal-lateral plane of the cargo aircraft, and a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;

a first fixed wing extending from the fuselage in a first direction away from the fuselage;

a second fixed wing extending from the fuselage in a second direction away from the fuselage, the second direction approximately symmetric about a longitudinal-vertical center plane of the cargo aircraft, wherein the cargo aircraft has an upper wing configuration with an upper wing surface extending across a top of the aircraft from the first fixed wing to the second fixed wing, and wherein a central portion of the upper wing surface defines an upper airfoil surface forward of the kinked portion that extends vertically higher than a forward portion of a structural surface of the kinked portion, the structural surface of the kinked portion extending from a forward end of the kinked portion to an aft end of the kinked portion; and a wing-body fairing disposed above at least the forward portion of the structural surface of the kinked portion of the fuselage, the wing-body fairing defining an upper transition surface that tangentially intersects an trailing edge of the upper airfoil surface forward of a point of maximum positive curvature of a structural surface and tangentially intersects an exterior surface of the fuselage aft of the point of maximum positive curvature, the wing-body fairing defining a maximum positive curvature less than the maximum positive curvature of the structural surface.

19. The cargo aircraft of claim 18,
wherein an exterior surface of the kinked portion defines a geometrical smooth transition between an exterior surface of the forward portion and an exterior surface of the aft portion.

20. The cargo aircraft of claim 19,
wherein the exterior surface of the kinked portion comprises a plurality of longitudinal panels extending from the forward portion to the aft portion, each of the plurality of longitudinal panels having complex curvature between an exterior of the forward end and an exterior of the aft portion.

* * * * *